United States Patent
Lee et al.

(10) Patent No.: US 12,289,277 B2
(45) Date of Patent: Apr. 29, 2025

(54) METHOD AND APPARATUS FOR PROVIDING COUNSELING SERVICE

(71) Applicant: KAKAO CORP., Jeju-si (KR)

(72) Inventors: Ho Jun Lee, Seongnam-si (KR); Yu Mi Kim, Seongnam-si (KR); Sung Yong Chang, Seongnam-si (KR); Jung Han Choi, Seongnam-si (KR); Bo Mi Hong, Seongnam-si (KR); June Kwon Moon, Seongnam-si (KR); Ji Soo Hwang, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 225 days.

(21) Appl. No.: 17/885,545

(22) Filed: Aug. 11, 2022

(65) Prior Publication Data

US 2023/0049661 A1    Feb. 16, 2023

(30) Foreign Application Priority Data

Aug. 11, 2021    (KR) .......................... 10-2021-0106330

(51) Int. Cl.
*G06Q 10/00*       (2023.01)
*G06Q 10/0631*   (2023.01)
(Continued)

(52) U.S. Cl.
CPC ...... *H04L 51/046* (2013.01); *G06Q 10/06311* (2013.01); *G06Q 10/1095* (2013.01)

(58) Field of Classification Search
CPC .... G06Q 10/02; G06Q 10/0631–06312; H04L 51/00–18
See application file for complete search history.

(56) References Cited

U.S. PATENT DOCUMENTS 8,423,387 B1 *   4/2013   Mirza ................... G16H 40/67
                                                                     705/3
10,827,071 B1 *  11/2020  Adibi ...................... H04L 67/53
(Continued)

FOREIGN PATENT DOCUMENTS

KR         20170020170 A     2/2017
KR         101796289 B1     11/2017
(Continued)

OTHER PUBLICATIONS

Online therapy is here to stay, Hannah Calkins, 2021 Trends Report, vol. 52 No. 1 Jan. 1, 2021 American Psychological Association (Year: 2001).*

(Continued)

*Primary Examiner* — Hafiz A Kassim
*Assistant Examiner* — Scott M Ross
(74) *Attorney, Agent, or Firm* — SEED IP LAW GROUP LLP

(57) ABSTRACT

Provided are a method and apparatus for providing a counseling service. A method of operating a counseling center server interworking with an instant messaging service includes providing a profile of at least one expert account for counseling linked to a channel of a second user to a terminal of a first user, identifying an initiation condition for a counseling ticket for counseling with a first expert account, creating a counseling ticket to be allocated to the first expert account, and transmitting counseling content through a chat room for counseling of the channel in which the first expert account and an account of the first user participate.

13 Claims, 21 Drawing Sheets

(51) Int. Cl.
*G06Q 10/1093* (2023.01)
*H04L 51/046* (2022.01)

(56) References Cited

U.S. PATENT DOCUMENTS

| | | |
|---|---|---|
| 11,907,180 B2 * | 2/2024 | Walling ................. G16H 40/67 |
| 2003/0023508 A1 * | 1/2003 | Deep ..................... G06Q 30/06 |
| | | 705/26.1 |
| 2003/0028399 A1 * | 2/2003 | Davis ..................... G16Z 99/00 |
| | | 705/2 |
| 2007/0203778 A1 * | 8/2007 | Lowson ........... G06Q 10/06316 |
| | | 705/7.14 |
| 2008/0147741 A1 * | 6/2008 | Gonen ................... G06Q 10/10 |
| 2016/0283889 A1 * | 9/2016 | Shukla ........... G06Q 10/063114 |
| 2017/0090736 A1 * | 3/2017 | King .................... G06Q 10/101 |
| 2018/0367484 A1 * | 12/2018 | Rodriguez .............. H04L 67/75 |
| 2019/0104092 A1 * | 4/2019 | Koohmarey ........... H04L 51/02 |
| 2021/0004825 A1 * | 1/2021 | Adibi ..................... H04L 51/02 |

FOREIGN PATENT DOCUMENTS

| | | |
|---|---|---|
| KR | 20200063282 A | 6/2020 |
| KR | 20210064048 A | 6/2021 |

OTHER PUBLICATIONS

Korean Office Action for KR Application No. 10-2021-0106330 mailed on Apr. 28, 2023.

* cited by examiner

520

| × | | ↑ | ⋮ |
| --- | --- | --- | --- |

Accounting Corporation AA OO Branch

Book

| Wed | Thurs | Fri | Sat | Sun | Mon | Tues |
| --- | --- | --- | --- | --- | --- | --- |
| (29) | 30 | 1 | 2 | 3 | 4 | 5 |

Today

Tax accountant Hong, Gil-Dong
18 years of experience
Guarantee perfect tax advice!
★★★★★

| ⏰ 12:30 | ⏰ 13:00 | 16:30 | 17:00 |

Tax accountant Choi, Go-Bong
15 years of experience
Tax advice
★★★★☆

| ⏰ 12:30 | ⏰ 13:00 | 16:30 | 17:00 |

Book

FIG.5B

METHOD AND APPARATUS FOR PROVIDING COUNSELING SERVICE

CROSS-REFERENCE TO RELATED APPLICATION

This application claims the benefit of Korean Patent Application No. 10-2021-0106330 filed on Aug. 11, 2021, in the Korean Intellectual Property Office, the entire disclosure of which is incorporated herein by reference for all purposes.

BACKGROUND

1. Field of the Invention

One or more example embodiments relate to a method and apparatus for providing a counseling service.

2. Description of the Related Art

Recently, with development of mobile smart devices, the use of online platform services for interaction with other users through networks is increasing. Typical examples of the online platform services for interaction with other users include a social networking service (SNS), which is an online platform that creates and strengthens social relationships through communication, information sharing, and social network expansion among users, and an instant messaging service (IMS), which is an online platform for real-time content communication among two or more users. As the interaction among users through such mobile devices increases, the online platform service supports not only a chat service for daily conversation with other users, but also a function of providing various services based on communication among a plurality of users.

Contact center as a service (CCaaS), a cloud-based service-type contact center solution, may be a service that provides an online counseling platform with various counseling functions including a chat interface and a chatbot. There is a need for development of CCaaS technology for companies to efficiently conduct and manage counseling by applying smart technology while consumers may request non-face-to-face counseling using mobile devices in an easy and quick way.

SUMMARY

According to an aspect, there is provided a method of operating a counseling center server interworking with an instant messaging service including providing, through an interface of a channel of a second user registered in the service, a profile of at least one expert account for counseling linked to the channel to a terminal of a first user, identifying, based on an input of the first user for selecting a profile of a first expert account among the provided profile of the at least one expert account, an initiation condition for a counseling ticket for counseling with the first expert account, creating a counseling ticket to be allocated to the first expert account based on the initiation condition for the counseling ticket, and transmitting counseling content through a chat room for counseling of the channel in which the first expert account and an account of the first user participate, based on a state of the counseling ticket.

The providing of the profile of the expert account to the terminal of the first user may include providing the profile of the expert account including authenticated credential information to the terminal of the first user.

The initiation condition for the counseling ticket may include at least one of a condition regarding reception of a message through the chat room for counseling of the channel corresponding to a first type of counseling, a condition regarding counseling time corresponding to a second type of counseling, and a condition regarding payment for counseling corresponding to a third type of counseling.

The creating of the counseling ticket may include creating the counseling ticket, based on the initiation condition for the counseling ticket corresponding to a first type of counseling, as a message is received from the account of the first user through the chat room for counseling of the channel, allocating the created counseling ticket to the first expert account in a waiting state, and changing the state of the counseling ticket from the waiting state to a progress state in response to a response message received from the first expert account through the chat room.

The creating of the counseling ticket may include creating a counseling ticket as a predetermined counseling time is reached based on the initiation condition for the counseling ticket corresponding to a second type of counseling, and allocating the created counseling ticket to the first expert account in a progress state.

The creating of the counseling ticket may include creating the counseling ticket based on the initiation condition for the counseling ticket corresponding to a third type of counseling as payment for counseling is completed, and allocating the created counseling ticket to the first expert account in a progress state.

The transmitting of the counseling content may include at least one of transmitting a message received from the first expert account through the chat room for counseling of the channel when the state of the counseling ticket is in a progress state, and transmitting a message received from the account of the first user through the chat room for counseling of the channel when the state of the counseling ticket is in the progress state.

The counseling content may include at least one counseling data created as a message, a video call link, and a digital file.

The transmitting of the counseling content may further include receiving an evaluation on the counseling from the account of the first user.

According to another aspect, there is provided a method of operating a counseling center server interworking with an instant messaging service including providing, through an interface of a channel of a second user registered in the service, at least one counseling product registered in correspondence with the channel to a terminal of a first user, creating, based on an input of the first user for selecting a first counseling product among the provided at least one counseling product, a counseling ticket corresponding to the first counseling product, allocating the counseling ticket to a first expert account having credential information corresponding to the first counseling product among at least one expert account linked to the channel, and transmitting, based on a state of the counseling ticket, counseling content through a chat room for counseling of the channel in which the first expert account and an account of the first user participate.

The creating of the counseling ticket may include creating the counseling ticket in response to payment of the first user for the first counseling product.

The allocating of the counseling ticket may include allocating the created counseling ticket to the first expert account in a waiting state, and changing the state of the counseling ticket from the waiting state to a progress state, in response to a response message received from the first expert account through the chat room.

The transmitting of the counseling content may include at least one of transmitting a message received from the first expert account through the chat room for counseling of the channel when the state of the counseling ticket is in a progress state, and transmitting a message received from the account of the first user through the chat room for counseling of the channel when the state of the counseling ticket is in the progress state.

The transmitting of the counseling content may include transmitting counseling data corresponding to the first counseling product through the chat room for counseling of the channel, when the state of the counseling ticket is in a progress state.

According to another aspect, there is provided a counseling center server interworking with an instant messaging service including at least one processor configured to provide, through an interface of a channel of a second user registered in the service, a profile of at least one expert account for counseling linked to the channel to a terminal of a first user, identify, based on an input of the first user for selecting a profile of a first expert account among the provided profile of the at least one expert account, an initiation condition for a counseling ticket for counseling with the first expert account, create, based on the initiation condition for the counseling ticket, a counseling ticket to be allocated to the first expert account, and transmit counseling content through a chat room for counseling of the channel in which the first expert account and an account of the first user participate, based on a state of the counseling ticket.

The processor may be configured to, in providing the profile of the expert account to the terminal of the first user, provide the profile of the expert account including authenticated credential information to the terminal of the first user.

The initiation condition for the counseling ticket may include at least one of a condition regarding reception of a message through the chat room for counseling of the channel corresponding to a first type of counseling, a condition regarding counseling time corresponding to a second type of counseling, and a condition regarding payment for counseling corresponding to a third type of counseling.

According to another aspect, there is provided a counseling center server interworking with an instant messaging service including at least one processor configured to provide, through an interface of a channel of a second user registered in the service, at least one counseling product registered in correspondence with the channel to a terminal of a first user, create, based on an input of the first user for selecting a first counseling product among the provided at least one counseling product, a counseling ticket corresponding to the first counseling product, allocate the counseling ticket to a first expert account having credential information corresponding to the first counseling product among at least one expert account linked to the channel, and transmit, based on a state of the counseling ticket, counseling content through a chat room for counseling of the channel in which the first expert account and an account of the first user participate.

The processor may be configured to, in creating the counseling ticket, create the counseling ticket in response to payment of the first user for the first counseling product.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 5A to 5C are diagrams illustrating an interface for a second type of counseling request according to an example embodiment;

DETAILED DESCRIPTION

Figure 1:
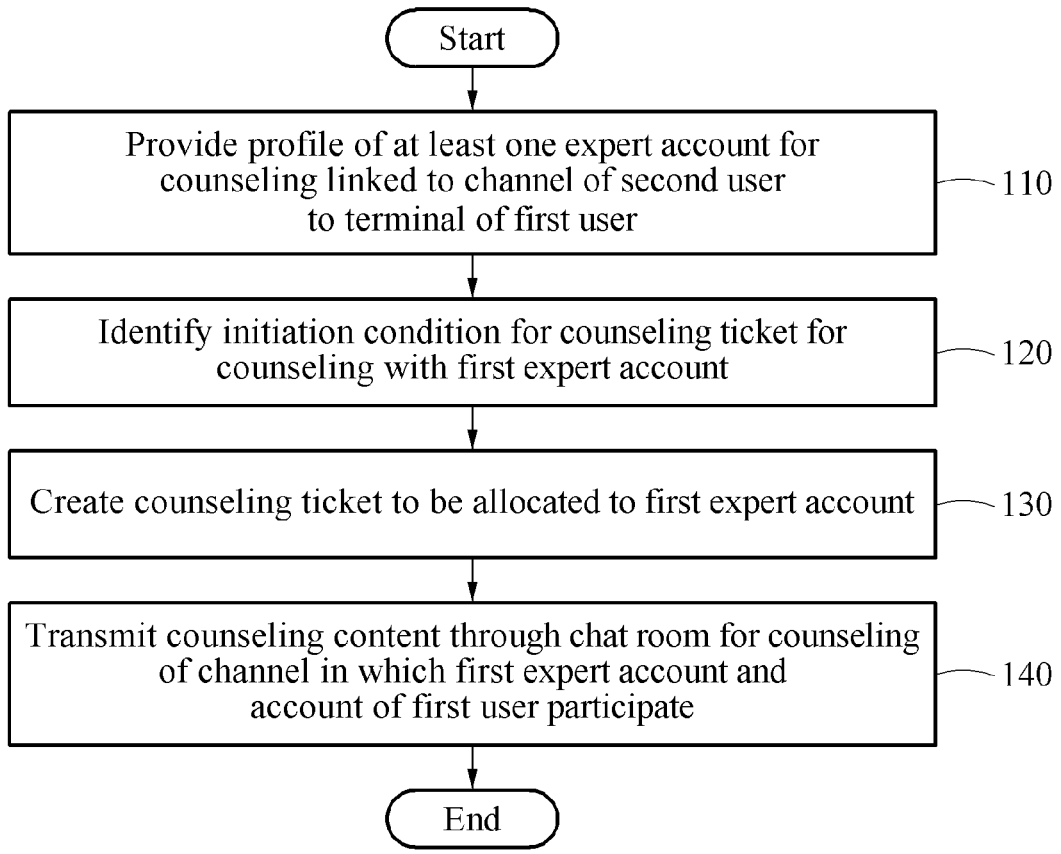
FIG. 1 is an operation flowchart illustrating a method of operating a counseling center server interworking with an instant messaging service according to an example embodiment.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components.

As used herein, the singular forms "a," "an," and "the" are intended to include the plural forms as well, unless the context clearly indicates otherwise. It will be further understood that the terms "comprise" and/or "have," when used in this specification, specify the presence of stated features, integers, steps, operations, elements, components or a combination thereof, but do not preclude the presence or addition of one or more other features, integers, steps, operations, elements, components, and/or groups thereof.

Hereinafter, example embodiments will be described in detail with reference to the accompanying drawings. When describing the example embodiments with reference to the accompanying drawings, like reference numerals refer to like components and a repeated to description related thereto will be omitted.

FIG. 1 is an operation flowchart illustrating a method of operating a counseling center server interworking with an instant messaging service according to an example embodiment.

Referring to FIG. 1, a method of operating a counseling center server interworking with an instant messaging service includes providing a profile of at least one expert account for counseling linked to a channel of a second user to a terminal of a first user 110, identifying an initiation condition for a counseling ticket for counseling with a first expert account 120, creating a counseling ticket to be allocated to the first expert account 130, and transmitting counseling content through a chat room for counseling of the channel in which the first expert account and an account of the first user participate 140.

The counseling center server according to an example embodiment may correspond to a server that provides a counseling service by interworking with an instant messaging service. The counseling service refers to a counseling service that uses an instant messenger connected to an instant messaging server that provides an instant messaging service as a counseling medium, and a user may use the counseling service by subscribing to the instant messaging service or through a registered account. The counseling center server and the instant messaging server may be included in a counseling system for providing a counseling service, and a detailed configuration of the counseling system will be described in detail with reference to FIG. 12 below. Hereinafter, the 'counseling center server' may be briefly referred to as a 'server'.

The instant messaging server according to an example embodiment may provide various types of accounts, such as a personal account, a corporate account, or a service account, to use the instant messaging service. The personal account may be an account for general users, the corporate account may be an account for specific companies, and the service account may be an account for specific services. The corporate account or the service account may be referred to as a channel.

The counseling service according to an example embodiment may be provided in the form of counseling through a channel registered in the instant messaging service. Counseling through a channel may refer to the counseling conducted in a chatting manner with a user account requesting the counseling to the channel through a chat room for the counseling of the channel. The chat room for counseling of a channel may correspond to a virtual chat space for transmitting and receiving chat messages between a user account requesting the counseling for the channel and a channel. An entity conducting the counseling linked to a channel may access a chat room for counseling of the channel and transmit and receive a chat message with a user account participating in the chat room. For example, the entity conducting the counseling may include a counselor account, an expert account, and a chatbot. Hereinafter, a chat room of a channel may be understood to refer to a chat room for counseling of a channel.

A counseling service according to an example embodiment may include a professional counseling service conducted in a chatting manner through a chat room of the channel between the first user account requesting the counseling on the first expert account linked to the channel of the second user and the first expert account. For example, the account of the first user may correspond to a personal account (an account of a natural individual) of the first user corresponding to a general user, and a channel of the second user may correspond to the corporate account or the service account of the second user corresponding to a specific company or a specific service provider.

According to an example embodiment, the channel of the second user may be linked to at least one expert account. The expert account, an account registered in an instant messaging service or a counseling center server, may correspond to an account having credential information. The first expert account linked to the channel of the second user may correspond to an expert account selected as a counseling partner by the first user among at least one expert account linked to the channel. The first expert account may conduct the counseling by transmitting and receiving a message to and from the account of the first user requesting the counseling through the chat room of the channel of the second user. The expert account linked to the channel of the second user may correspond to an account granted access to the chat room of the channel. The right to access the chat room of the channel may correspond to the right to transmit a message through the chat room of the channel and receive the message transmitted through the chat room of the channel.

According to an example embodiment, the right to access the chat room of the channel of the expert account linked to the channel of the second user may be limited to a part of the chat room of the channel. As will be described in detail below, the first expert account may have the right to access a part of the chat room of the channel of the second user and the second expert account may have the right to access the other part of the chat room of the channel of the second user. When the first expert account linked to the channel of the second user is not granted access to a first chat room of the channel, the first expert account is not allowed to transmit messages through the first chat room using the channel. On the other hand, an expert account not granted access to the chat room may be set to be allowed, depending on the channel, to view messages transmitted and received through the chat room of the channel, or vice versa. The right to access the chat room of the channel of the expert account will be described in detail below.

Operation 110 according to an example embodiment may include providing, through an interface of the channel of the second user registered in the instant messaging service, a profile of at least one expert account for counseling linked to the channel of the second user to the terminal of the first user. For example, the interface of the channel of the second user may include a profile interface of the channel of the second user.

According to an example embodiment, the interface of the channel may correspond to an interface related to the channel provided to the terminal of the first user in an instant messenger. The server may provide the profile of the at least one expert account linked to the channel to the terminal of the first user through the interface of the channel. As an example, the server may provide information on the at least one expert account linked to the channel to the instant messaging server, and the instant messaging server may provide a profile view of the expert account linked to the channel through an interface of the channel based on the received information on the expert account. As another example, the server may provide information on the at least one expert account linked to the channel to the terminal of the first user through the interface of the channel without passing through the instant messaging server.

Figure 2:
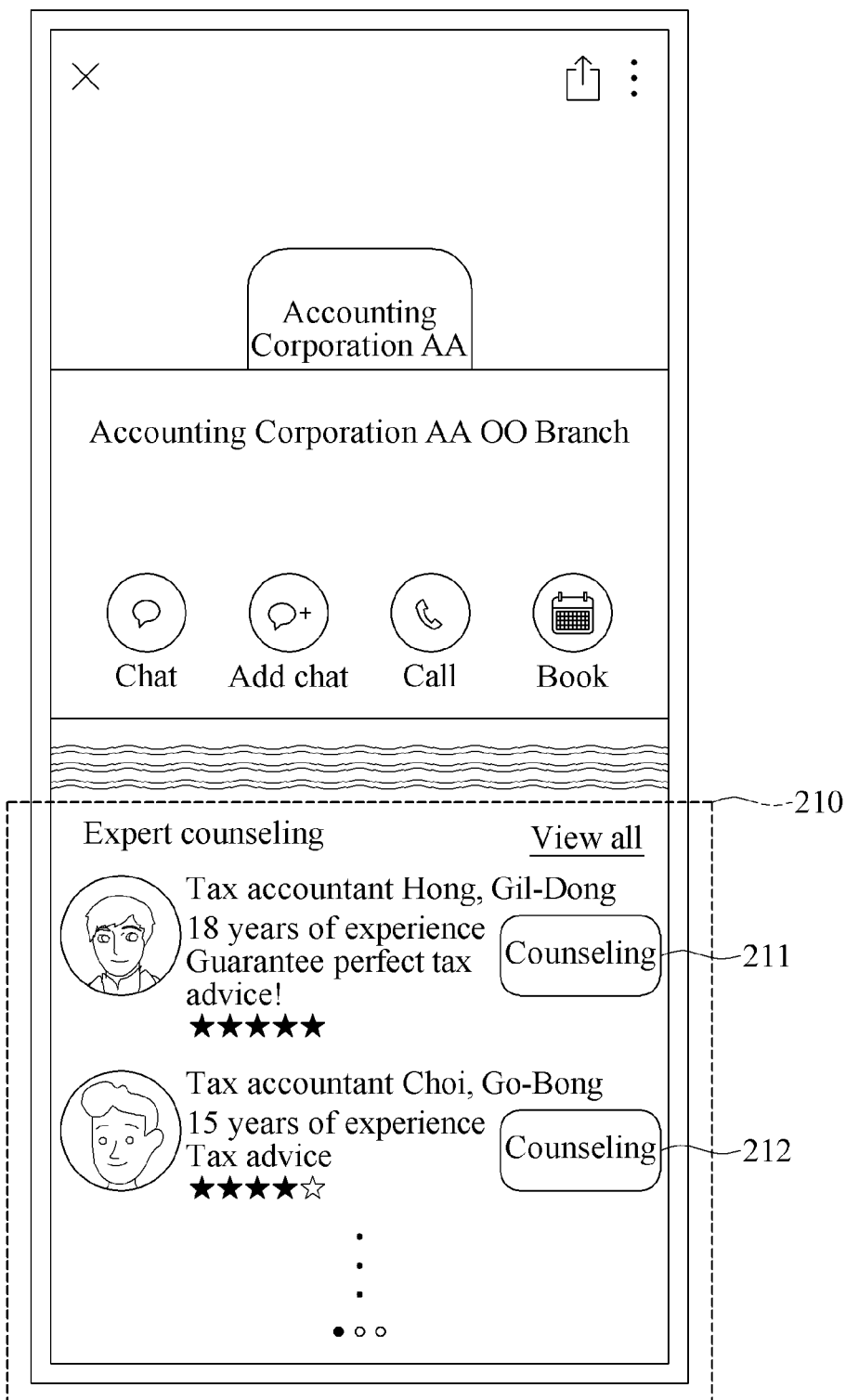
FIG. 2 is a diagram illustrating an interface of a channel including a profile of an expert account according to an example embodiment.

For example, referring to FIG. 2, an interface 200 of the channel of the second user may include a profile view 210 that displays the profile of the at least one expert account linked to the channel. The profile view 210 may include a profile of each expert account linked to a channel, and the profile of the expert account may include identification information such as a name, photo, and introduction text corresponding to the expert account. The profile view 210 shown in FIG. 2 is an example in which the profile of the expert account is displayed through the interface, and the profile view provided through the interface of the channel may be implemented in various forms to display information on the profile of the expert account.

Operation 110 according to an example embodiment may include providing the profile of the expert account including the authenticated credential information to the terminal of the first user. As described above, the expert account may correspond to an account having credential information, and the profile of the expert account may include authenticated credential information. The credential information is information to prove the identity, status, and capability that the user account has, and may include, for example, a driver's license, student ID, employee ID, and other certifications. The authenticated credential information may correspond to credential information verified to be issued for the authenticated real name of a user account from a trusted authority based on authentication of the user account.

Figure 3A:
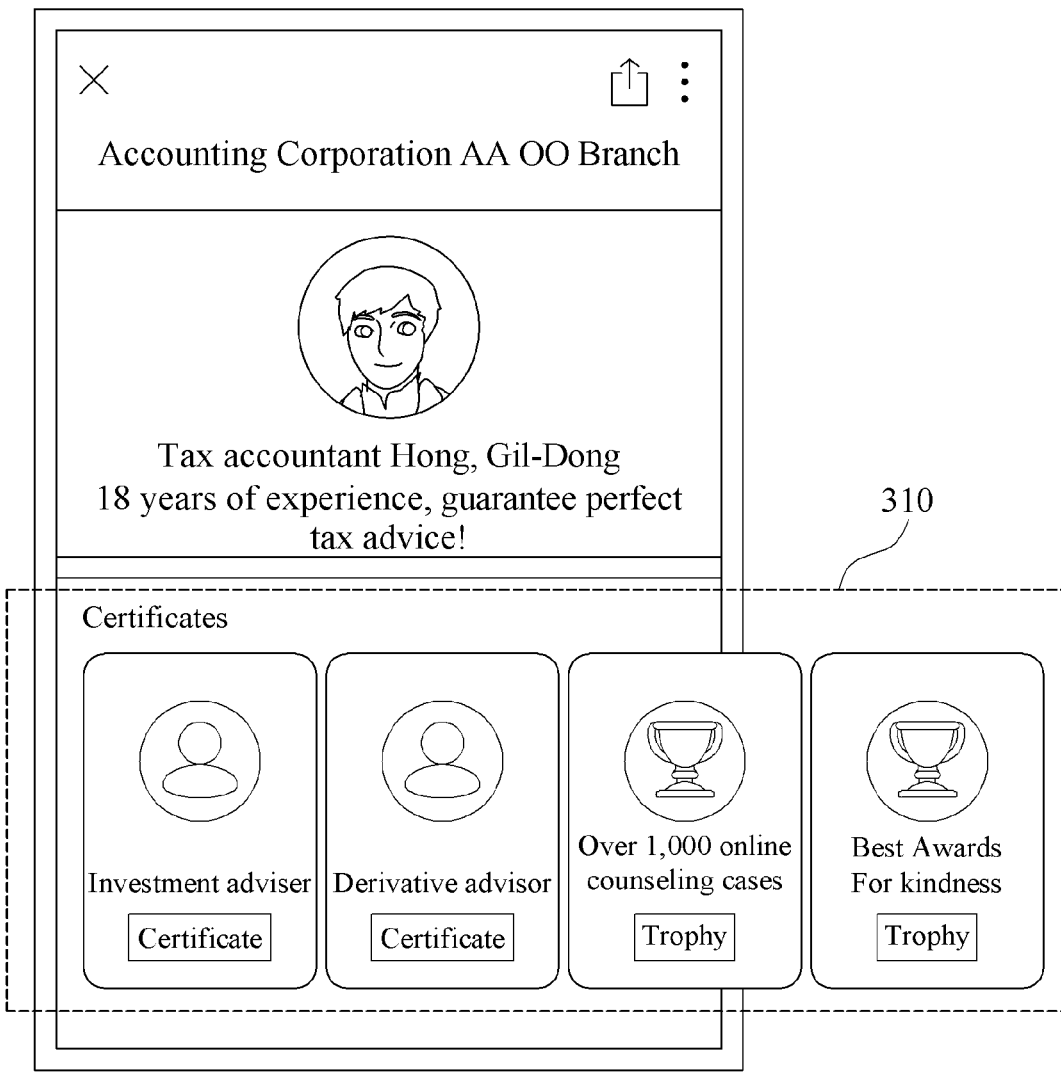
FIGS. 3A and 3B are diagrams illustrating an interface displaying credential information of a profile of an expert account according to an example embodiment.
Figure 3B:
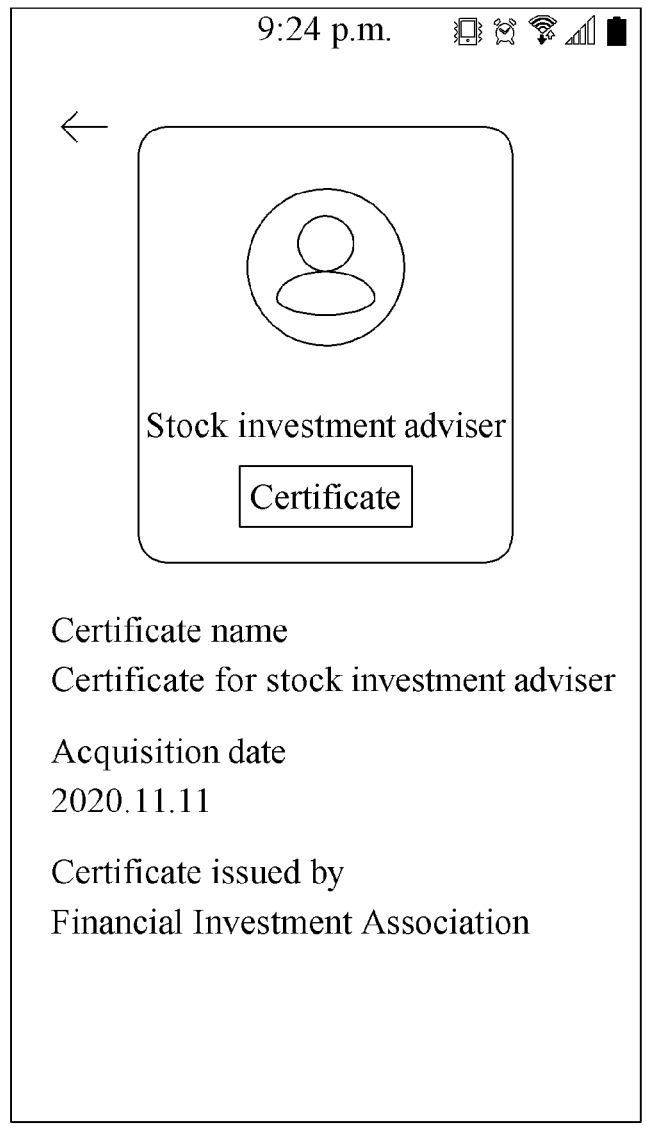

According to an example embodiment, authenticated credential information of an expert account may be displayed through the profile view. For example, the terminal of the first user may request a server for detailed information on the profile of the expert account included in the profile view through the interface 200 of the channel shown in FIG. 2. For another example, when the profile of the expert account is stored and/or managed in the instant messaging server, the terminal of the first user may request the instant messaging server for detailed information on the profile of the expert account included in the profile view through the interface 200 of the channel shown in FIG. 2. Based on the request for detailed information, as shown in FIG. 3A, an interface 300 for displaying detailed information on the profile of the expert account may be provided to the terminal of the first user. The interface 300 for displaying detailed information on the profile of the expert account may provide a list 310 of credential information possessed by the expert account. When an input for selecting specific credential information from the list 310 of credential information is received, as shown in FIG. 3B, an interface 320 for displaying detailed information on the credential information may be provided. The detailed information on the credential information may include specific information regarding the credential information, such as a name of certificate, an acquisition date, and an acquisition institution.

Referring back to FIG. 1, operation 120 according to an example embodiment may include identifying an initiation condition for a counseling ticket for counseling with the first expert account based on an input of the first user for selecting the profile of the first expert account among the profiles of the expert account provided in operation 110.

According to an example embodiment, the input of the first user for selecting the profile of the first expert account may include an input for requesting the counseling with the first expert account. For example, referring to FIG. 2, an input for selecting (e.g., click) a button 211 or 212 for requesting the counseling with a specific expert account in a profile view 210 provided through the interface 200 of the channel may correspond to the input of the first user selecting the profile of the first expert account. For example, based on the input of the first user for selecting the profile of the first expert account, a signal requesting the counseling with the first expert account through the channel of the second user may be transmitted to the server. As another example, based on the input of the first user for selecting the profile of the first expert account, a signal requesting the counseling with the first expert account through the channel of the second user may be transmitted to the instant messaging server. In this case, a signal requesting the counseling with the first expert account may be transmitted to the server through the instant messaging server.

According to an example embodiment, the input of the first user for selecting the profile of the first expert account may include an input for requesting a specific type of counseling with the first expert account. For example, the input of the first user for selecting the profile of the first expert account may include an input for requesting a first type of counseling with the first expert account, an input for requesting a second type of counseling, or an input for requesting a third type of counseling. The type of counseling may be determined by the selection of the first user, or may be determined as a predetermined type corresponding to the first expert account or a channel of the second user. The types of counseling will be described in detail below.

According to an example embodiment, when the input of the first user for selecting the profile of the first expert account is received, a chat room of a channel in which the account of the first user participates may be created. More specifically, the input of the first user for selecting the profile of the first expert account through the interface of the channel may be transmitted to the instant messaging server, and the instant messaging server may create a chat room of the channel for conducting the counseling with the first expert account. The instant messaging server may provide a chat interface for counseling corresponding to the chat room of the created channel to the terminal of the first user. The chat interface for counseling may correspond to a user interface for transmitting and receiving counseling content including a chat message for the counseling and displaying the transmitted and received message.

The initiation condition for a counseling ticket according to an example embodiment is a condition required for creating a counseling ticket, and the server may create a counseling ticket in response to satisfaction of the initiation condition for a counseling ticket. According to an example embodiment, a counseling ticket, a unit of counseling objectified in the server, may correspond to a session for counseling between a specific user account and a specific channel. The counseling ticket may be created in correspondence to a chat room of a channel, and the counseling with a user account through the chat room of a channel may be objectified as a counseling ticket to be stored in a server or a database accessible from the server. For example, the counseling ticket may include a chat log transmitted and received between a specific user account and a specific channel through a corresponding chat room.

The initiation condition for the counseling ticket according to an example embodiment may be determined in correspondence with a type of counseling requested by the account of the first user. As described above, the input of the first user for selecting the profile of the first expert account may include an input for requesting a specific type of counseling with the first expert account. According to an example embodiment, the input of the first user for selecting the profile of the first expert account may include information for indicating the expert account as a counseling partner and information for indicating the type of counseling. The server may identify the initiation condition for a counseling ticket based on the type of counseling requested by the input of the first user.

As an example, the initiation condition for a counseling ticket may include a condition regarding reception of a message through a chat room for counseling of a channel corresponding to the first type of counseling. The first type of counseling is a type corresponding to a general counseling requesting the counseling directly for the first expert account. The server may recognize that the initiation condition for a counseling ticket corresponding to the first type of counseling is satisfied when the message is received from the account of the first user through the chat room for counseling of the channel.

As another example, the initiation condition for a counseling ticket may include a condition regarding a counseling time corresponding to the second type of counseling. The second type of counseling is a type corresponding to reserved counseling that the counseling is requested by setting a time to initiate the counseling for the first expert account, and the server may recognize that the initiation condition for a counseling ticket corresponding to the second type of counseling is satisfied when the set counseling time is reached.

As another example, the initiation condition for the counseling may include a condition regarding payment for the counseling corresponding to the third type of counseling. The third type of counseling is a type of paid counseling to request the counseling that payment is required for the first expert account. The server may recognize that the initiation condition for a counseling ticket corresponding to the third type of counseling is satisfied when the payment for the counseling is completed.

Referring back to FIG. 1, operation 130 according to an example embodiment may include creating a counseling ticket to be allocated to the first expert account based on the initiation condition for a counseling ticket. The server may create a counseling ticket corresponding to the counseling with the first expert account requested by the first user when recognizing that the initiation condition for the counseling ticket is satisfied. The created counseling ticket may be allocated to the first expert account. The created counseling ticket may correspond to a chat room of a channel in which the account of the first user participates.

According to an example embodiment, the first expert account may be granted access to a chat room of a channel corresponding to the allocated counseling ticket. According to an example embodiment, a message transmitted by an expert account granted access to a chat room of a channel through a chat room of the channel may be displayed as a message transmitted by the expert account. In other words, the message transmitted by the expert account through the chat room of the channel corresponding to the allocated counseling ticket may be displayed as a message transmitted by the expert account, not a message transmitted by the channel of the second user. For example, using the profile for an expert account, a message transmitted by the expert account may be displayed in a chat room of the channel of the second user.

Operation 140 according to an example embodiment may include transmitting, based on the state of the counseling ticket, counseling content through a chat room for counseling of a channel in which the first expert account and the account of the first user participate. For example, the counseling content may include at least one of counseling datas created as a message, a video call link, and a digital file. The counseling data created as a digital file may include data about the counseling created in the form of an image, video, or sound file that may be transmitted through a chat room of a channel.

According to an example embodiment, the transmission of the counseling content through a chat room of a channel may be performed through an instant messaging server. For example, a message transmitted from the terminal of the first user logged in with the account of the first user may be transmitted to the server through the instant messaging server, and the server may deliver the received message to the first expert account. As another example, a message transmitted from the terminal logged in with the first expert account may be transmitted to the server, and the message may be transmitted from the server to the terminal of the first user through the instant messaging server.

According to an example embodiment, the transmission of the counseling content through a chat room of a channel may be performed when the counseling ticket corresponds to a predetermined specific state. For example, the transmission of the counseling content through a chat room of a channel may be performed when the state of the counseling ticket corresponds to the progress state. In other words, operation 140 of transmitting the counseling content according to an example embodiment may include at least one of transmitting, when the state of a counseling ticket is in the progress state, a message received from the first expert account through the chat room for counseling of the channel, and transmitting, when the state of a counseling ticket is in the progress state, a message received from an account of the first user through a chat room for counseling of a channel.

According to an example embodiment, the counseling ticket may correspond to any one of a plurality of states corresponding to the progress of the counseling. The state in which the counseling ticket may have may be determined by the type of counseling corresponding to the counseling ticket, and the state of the counseling ticket may be changed according to occurrence of an event related to the counseling ticket that occurs while the counseling is being conducted.

For example, a counseling ticket corresponding to a first type of counseling may be classified into a waiting state, a progress state, and an end state. The state of the counseling ticket corresponding to the first type of counseling may be changed to the waiting state when an event in which the counseling ticket is allocated to the expert account occurs, and the counseling ticket may be changed into the progress state when a message is received from the expert account to which the counseling ticket is allocated through the chat room of the channel. In addition, when an event in which the counseling ticket is terminated occurs, the state of the counseling ticket may be changed to the end state.

According to an example embodiment, when the type of the requested counseling is the first type, an initiation condition for a counseling ticket may be identified as a condition corresponding to the first type of counseling. In this case, operation 130 of creating a counseling ticket may include creating, based on an initiation condition for a counseling ticket corresponding to the first type of counseling, a counseling ticket as a message is received from the account of the first user through a chat room for counseling of a channel, allocating the created counseling ticket to the first expert account in the waiting state, and changing the state of the counseling ticket from the waiting state to the progress state in response to a response message received from the first expert account through a chat room of the channel corresponding to the counseling ticket.

Figure 4:
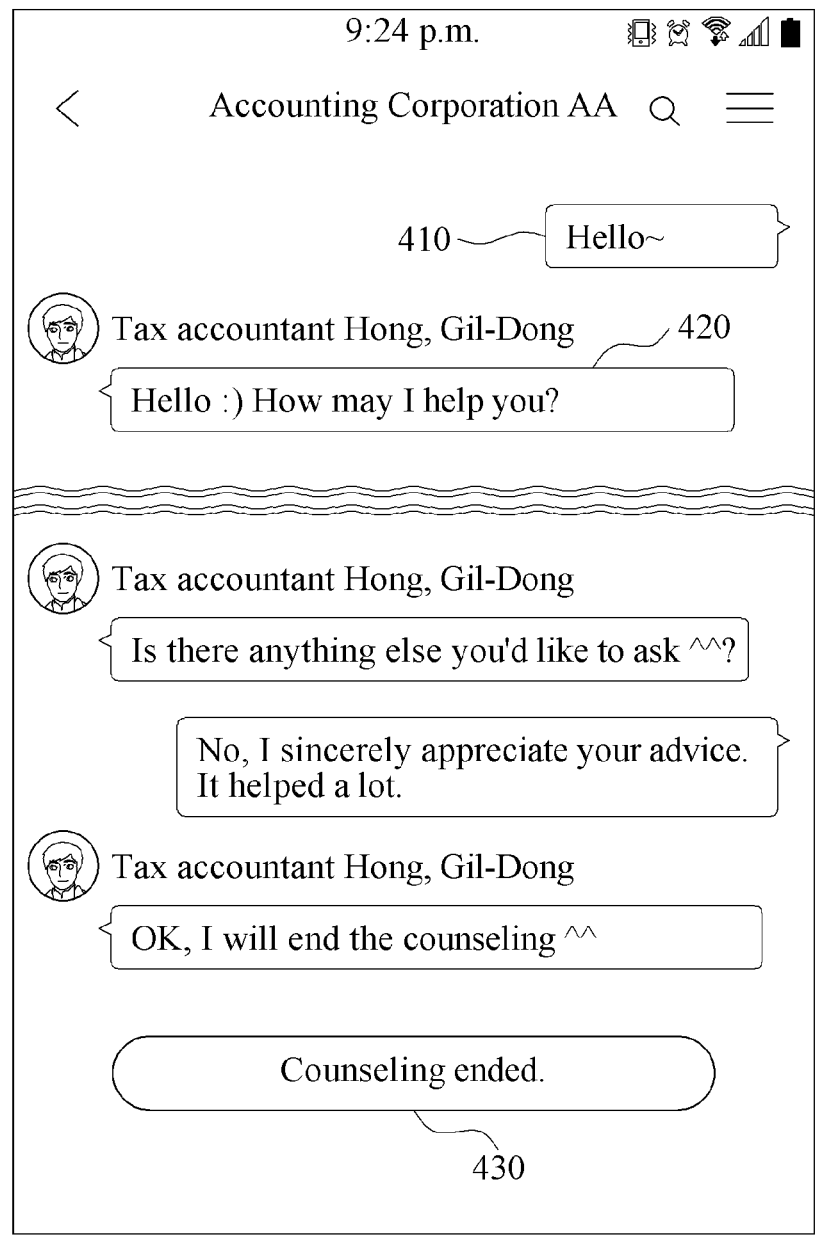
FIG. 4 is a diagram illustrating a chat room interface corresponding to a first type of counseling request according to an example embodiment.

For example, referring to FIG. 2, the terminal of the first user may request the first type of counseling with the first expert account, by selecting a button 211 or 212 for requesting the counseling with the first expert account through an interface of a channel. Referring to FIG. 4, a chat room of a channel in which the account of the first user participates may be created in response to a counseling request. When a message 410 is received from the first user account through the chat room according to the initiation condition for a counseling ticket corresponding to the first type of counseling, a counseling ticket may be created, and the created counseling ticket may be allocated to the first expert account in the waiting state. When a response message 420 is received through a chat room from the first expert account to which the counseling ticket is allocated, the counseling ticket may be changed to the progress state. Based on the progress state of the counseling ticket, the counseling may be conducted by transmitting and receiving counseling content through a chat room in which the first user account and the first expert account participate.

According to an example embodiment, when the counseling is completed, the first expert account or the account of the first user may request the server to terminate the counseling, and the counseling ticket may be changed to the end state when a request for terminating the counseling is received. When changed to the end state, the transmission of the counseling content through the chat room of the channel may be stopped. As an example, referring to FIG. 4, when the state of the counseling ticket is changed to the end state, a message 430 notifying that the counseling ticket is terminated may be displayed through the chat room of the channel.

For example, a counseling ticket corresponding to the second type of counseling and/or the third type of counseling may be divided into the progress state and the end state. The state of the counseling ticket corresponding to the second type of counseling and/or the third type of counseling may be changed to the progress state when an event in which the counseling ticket is allocated to an expert account occurs, and the state of the counseling ticket may be changed to the end state when an event in which the counseling ticket is terminated occurs.

According to an example embodiment, when the type of requested counseling is the second type, the initiation condition for a counseling ticket may be identified as a condition corresponding to the second type of counseling. In this case, operation 130 of creating the counseling ticket may include creating a counseling ticket as a predetermined counseling time is reached, and allocating the created counseling ticket to the first expert account in the progress state.

Figure 5A:
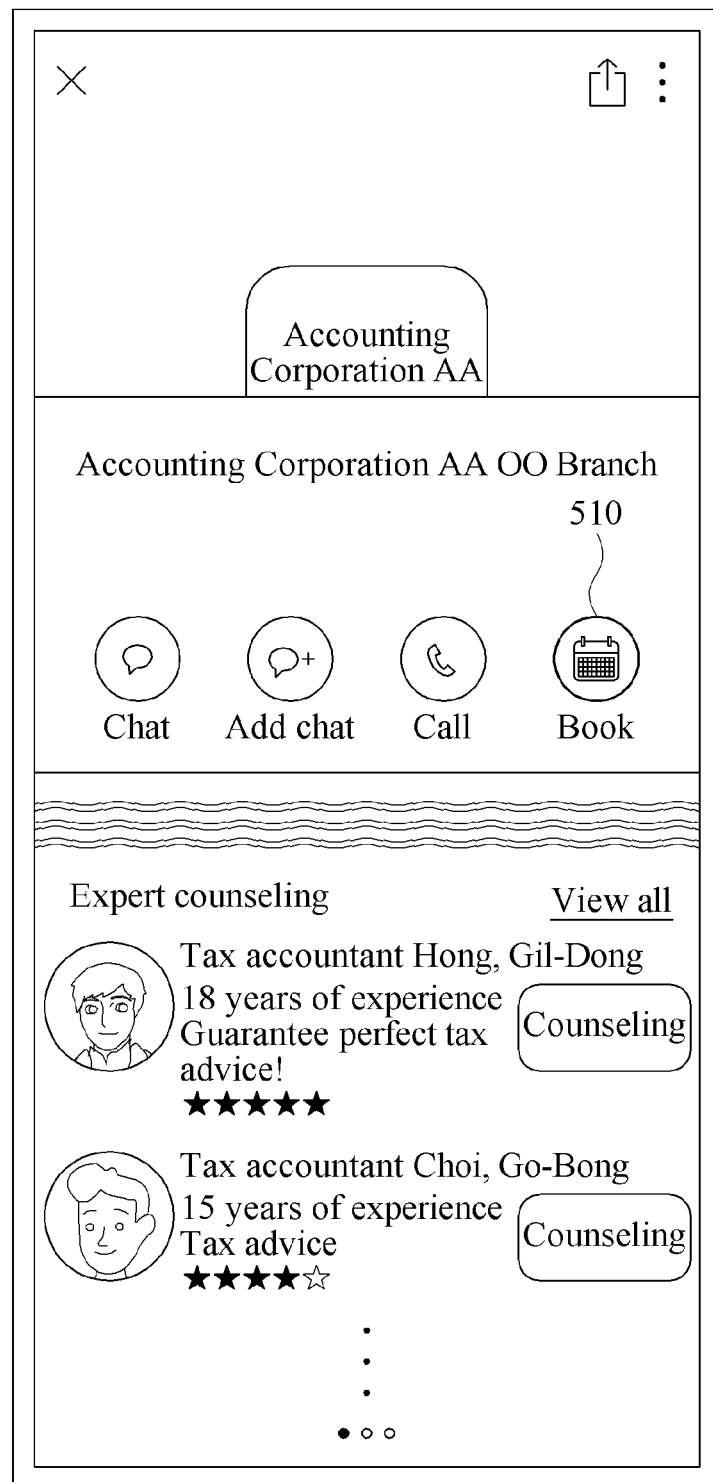
Figure 5C:
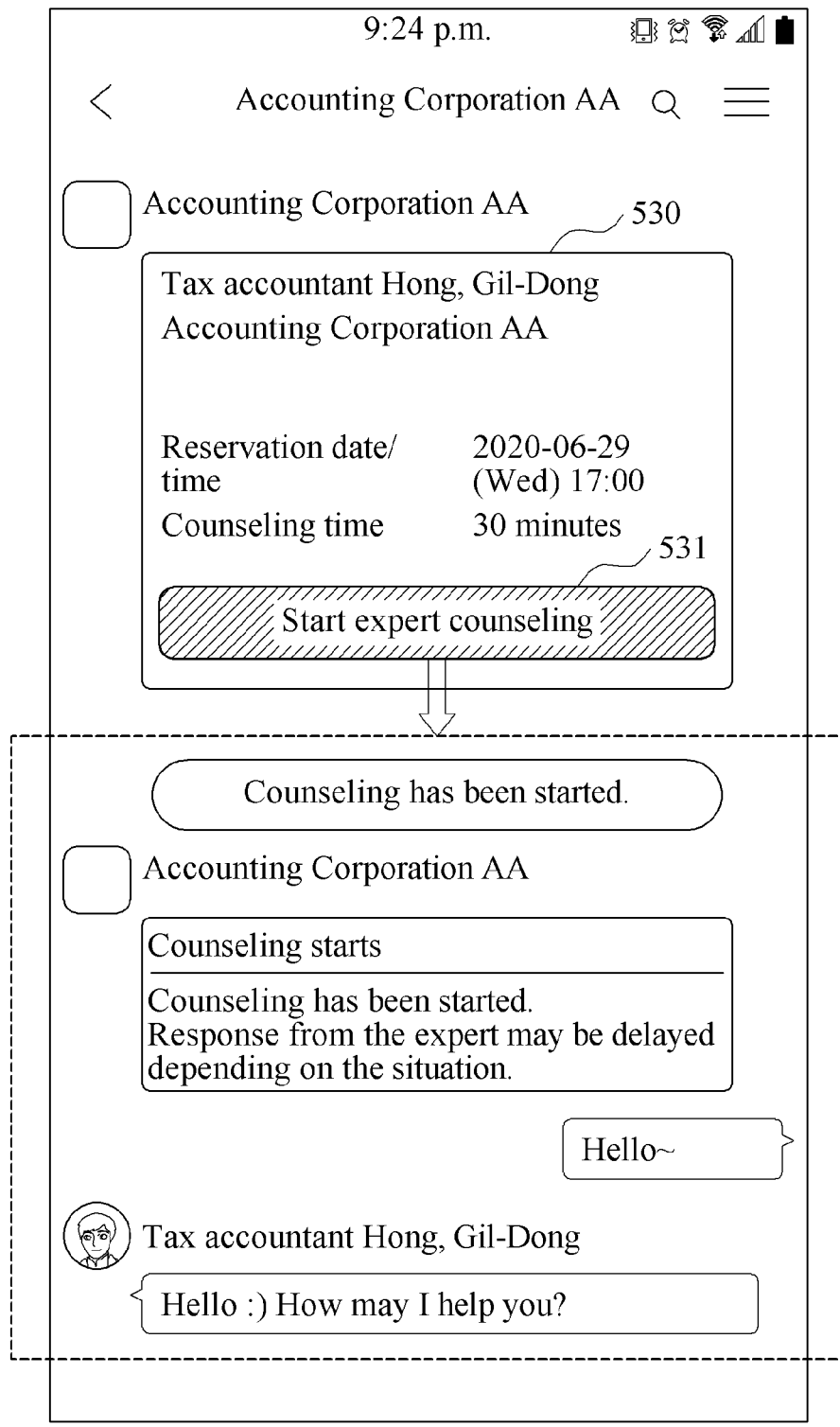

For example, referring to FIG. 5A, the terminal of the first user may receive an interface 520 for making a counseling reservation with an expert account shown in FIG. 5B, by selecting a button 510 for requesting the counseling reservation with the expert account through the interface of the channel. The terminal of the first user may request a server for the second type of counseling with the first expert account by inputting the information required for the counseling reservation including the expert account, the counseling date, and time through the interface 520 for the counseling reservation. Referring to FIG. 5C, in response to the request for the second type of counseling with the first expert account, a chat room of a channel in which the account of the first user participates may be created. A message 530 for notifying details on the reservation for the counseling including information on the expert account and counseling time may be transmitted through the chat room of the created channel. When the current point of time reaches a predetermined counseling time according to the initiation condition for a counseling ticket corresponding to the second type of counseling, a counseling ticket may be created, and the created counseling ticket may be allocated to the first expert account. Based on the progress state of the counseling ticket, the counseling may be conducted as the counseling content is transmitted and received through the chat room in which the first user account and the first expert account participate.

As an example, the message 530 for notifying the reservation details of the second type of counseling may be implemented as an interfacing object including a function of requesting initiation of the counseling. Referring to FIG. 5C, when the reservation time is reached according to the initiation condition for a counseling ticket corresponding to the second type of counseling, a button 531 for requesting the initiation of the counseling of the message 530 may be activated, and the state of the counseling ticket may be changed to the progress state in response to an input of selecting the button 531 for requesting the initiation of the counseling. In this case, as the counseling ticket is changed to the progress state, counseling may be conducted as the counseling content is transmitted and received through a chat room in which the first user account and the first expert account participate.

Figure 6A:
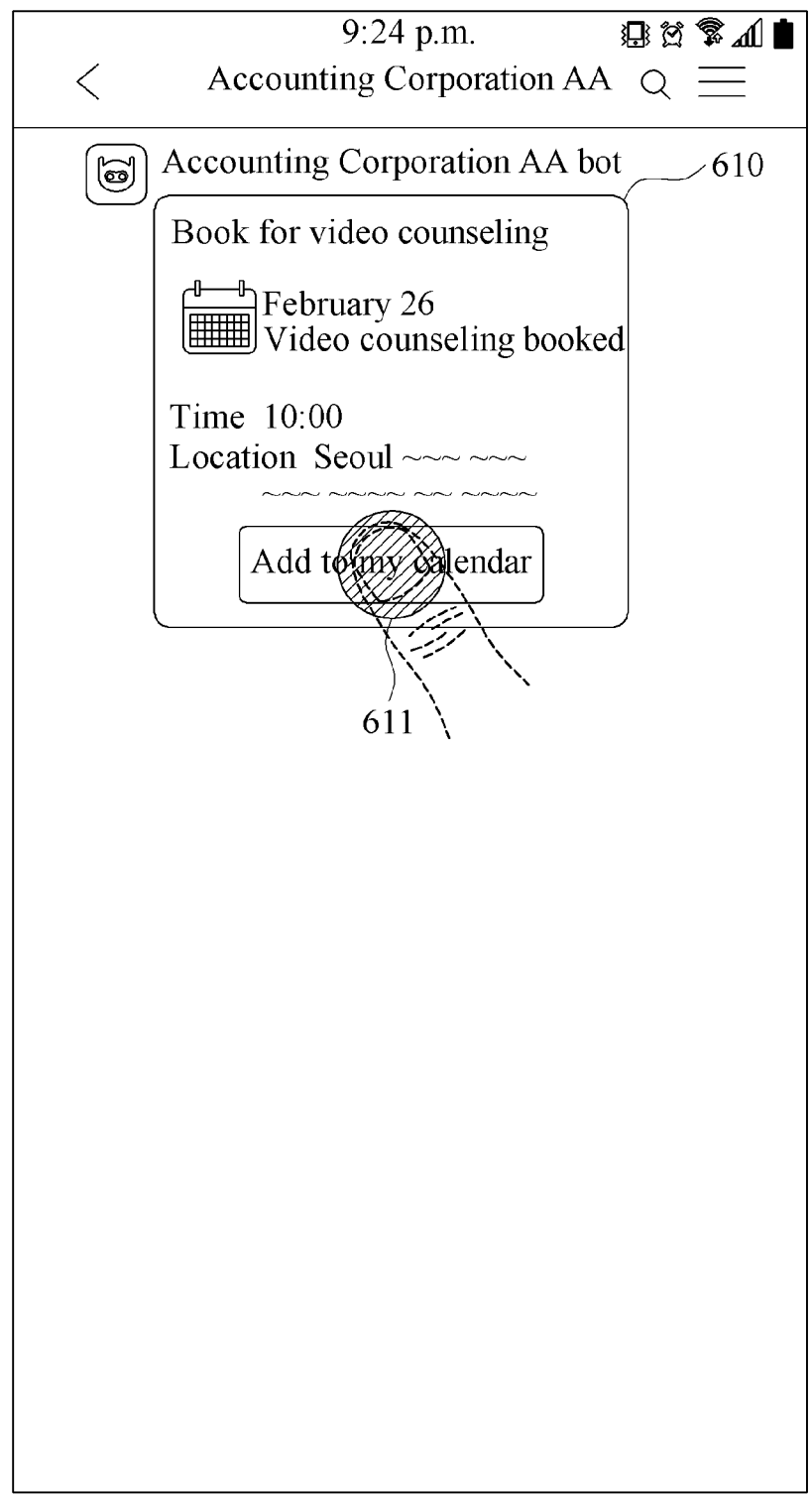
FIGS. 6A and 6B are diagrams illustrating an interface for registering a counseling schedule in a calendar according to an example embodiment.
Figure 6B:
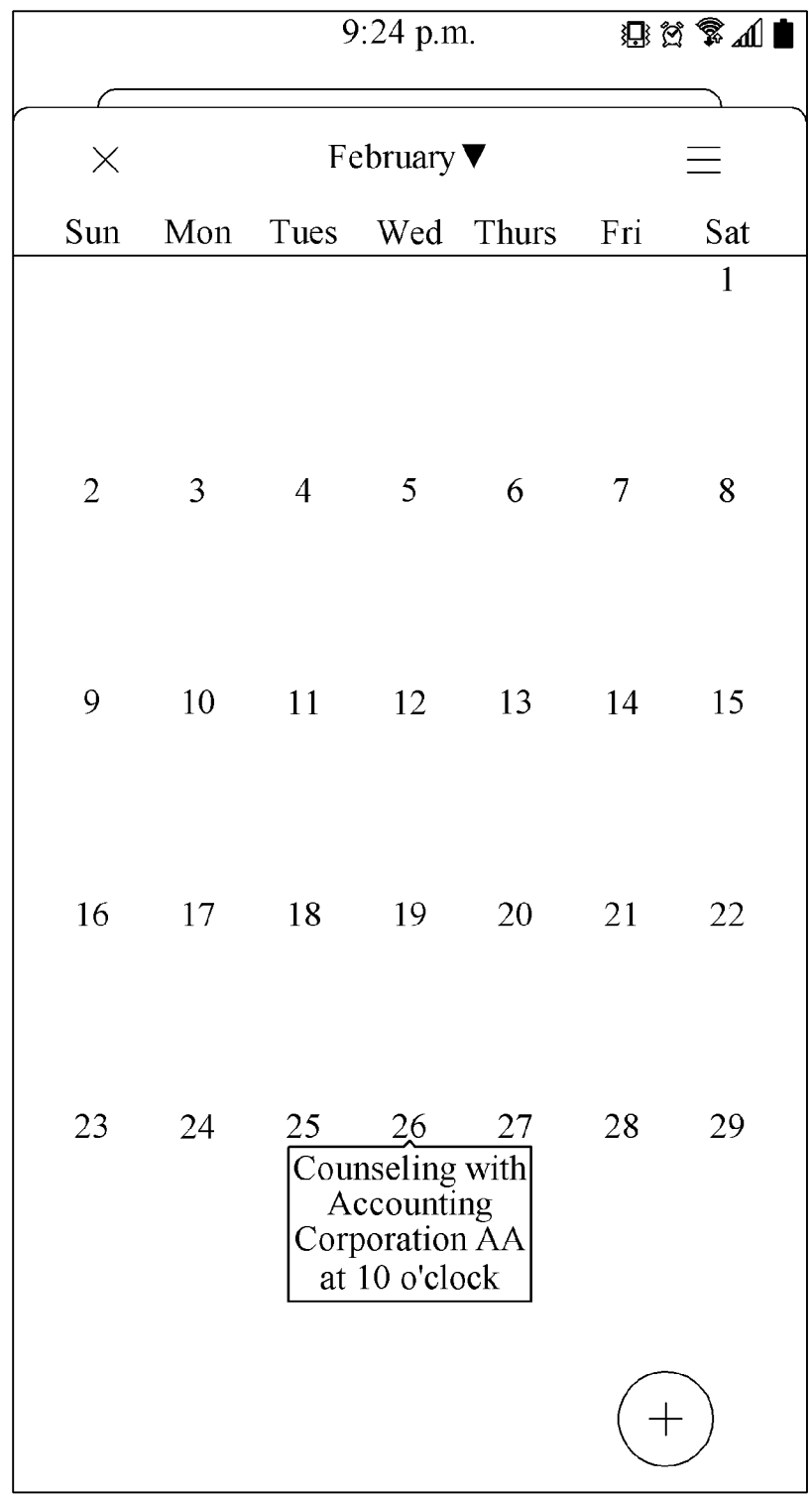

As another example, a message for notifying the reservation details of the second type of counseling may be implemented as an interfacing object including a function of registering a counseling schedule in a calendar linked with an instant messaging service. Referring to FIG. 6A, a message 610 for notifying the reservation details of the counseling may include a button 611 for requesting registration of a counseling schedule in a calendar linked with an instant messaging service. In response to an input of selecting the button 611 for requesting registration of the counseling schedule, the counseling schedule may be registered in the calendar corresponding to the first user as shown in FIG. 6B. The calendar corresponding to the first user may include a calendar provided in correspondence with an account of the first user in the instant messaging service and/or a calendar installed in a terminal of the first user.

According to an example embodiment, when the type of requested counseling is a third type, an initiation condition for a counseling ticket may be identified as a condition corresponding to the third type of counseling. In this case, operation 130 of creating the counseling ticket may include creating a counseling ticket in response to completion of the payment for the counseling corresponding to the initiation condition of the counseling ticket, and allocating the created counseling ticket to the first expert account.

Figure 7A:
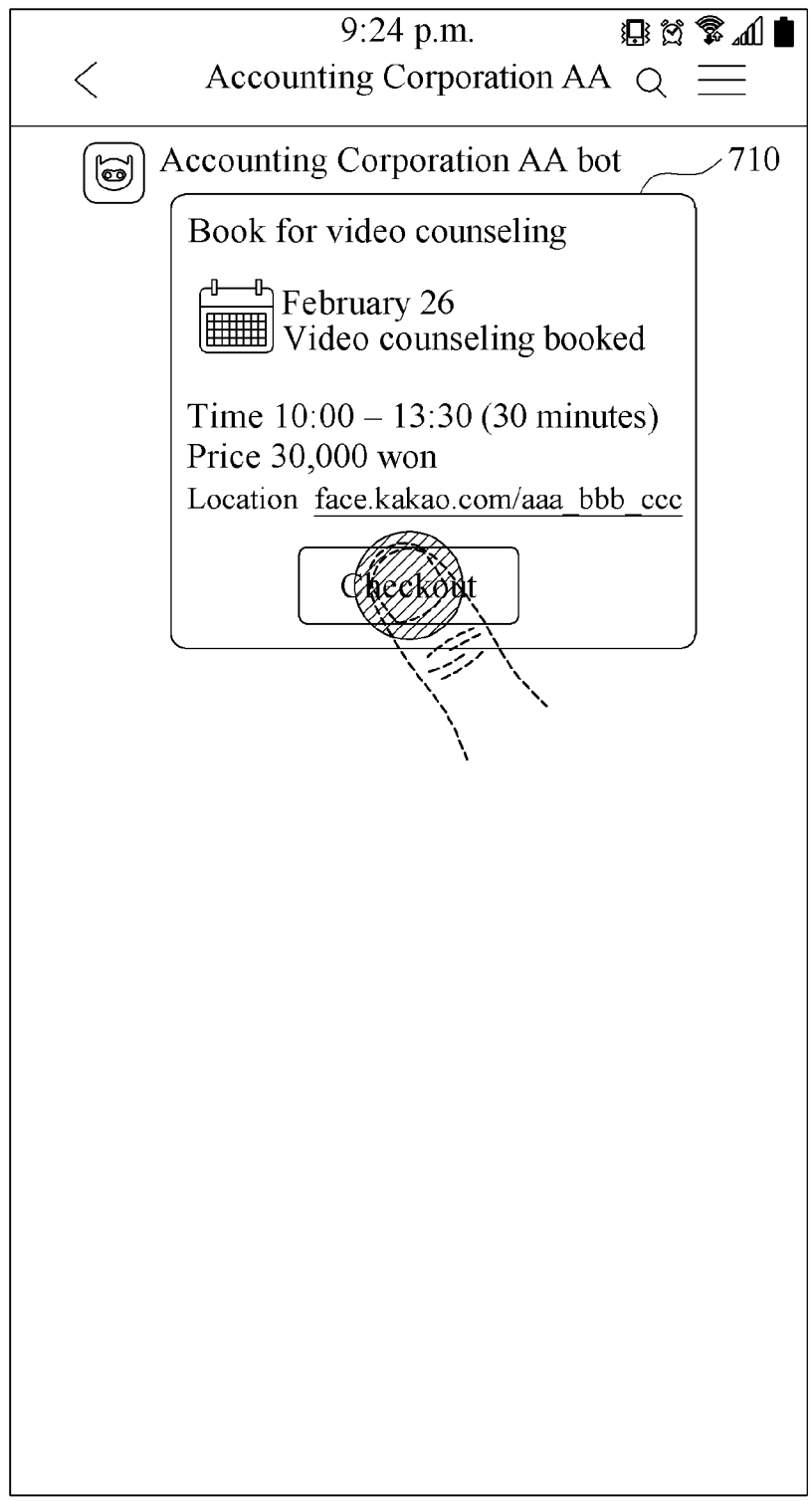
FIGS. 7A and 7B are diagrams illustrating an interface for a paid counseling request according to an example embodiment.

For example, the counseling with a specific expert account may be set for a fee, and the terminal of the first user may request the third type of counseling with the expert account set for a fee through the interface of the channel. Referring to FIG. 7A, in response to the request for the third type of counseling, a chat room of a channel in which the account of the first user participates may be created. A message 710 for requesting payment for the third type of counseling may be transmitted through the created chat room of the channel. When the payment for the counseling is completed according to the initiation condition for the counseling ticket corresponding to the third type of counseling, a counseling ticket may be created, and the created counseling ticket may be allocated to the first expert account. Based on the progress state of the counseling ticket, counseling may be conducted as counseling content is transmitted and received through a chat room in which the first user account and the first expert account participate.

Figure 7B:
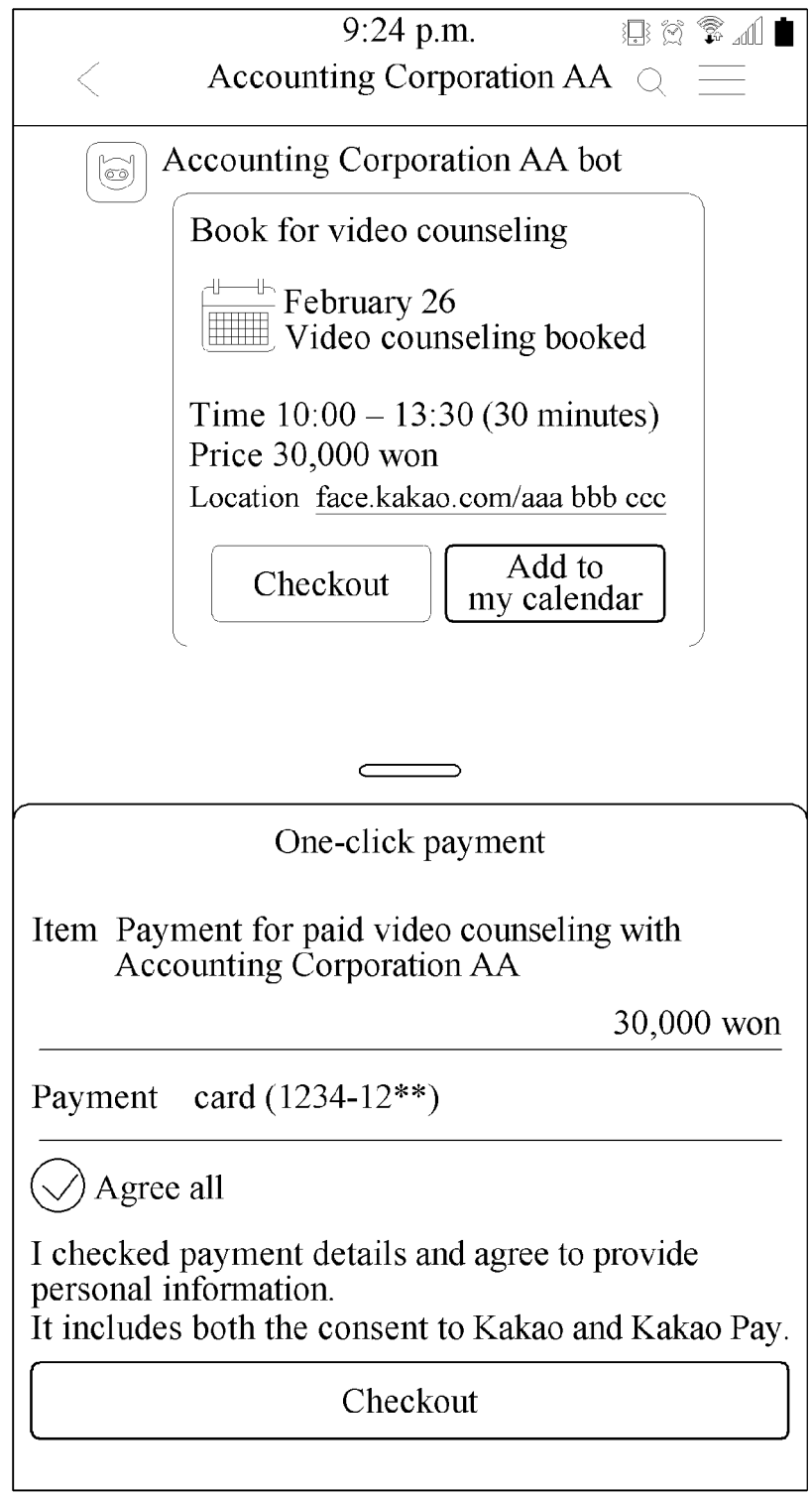

As an example, the message 710 for requesting the payment for the third type of counseling may be implemented as an interfacing object including a function of requesting the payment for the counseling. In response to an input for selecting a payment request button 711 of the message 710 for requesting the payment for the counseling, a plug-in for payment may be executed as shown in FIG. 7B. When the payment is completed through the plug-in for payment, a counseling ticket corresponding to the third type of counseling may be changed to the progress state.

According to an example embodiment, the third type of counseling request may include a counseling reservation request for designating a counseling time. In this case, the initiation condition for a counseling ticket corresponding to the third type of counseling may correspond to a condition that is satisfied when the payment for counseling is completed and the scheduled counseling time is reached.

Figure 8A:
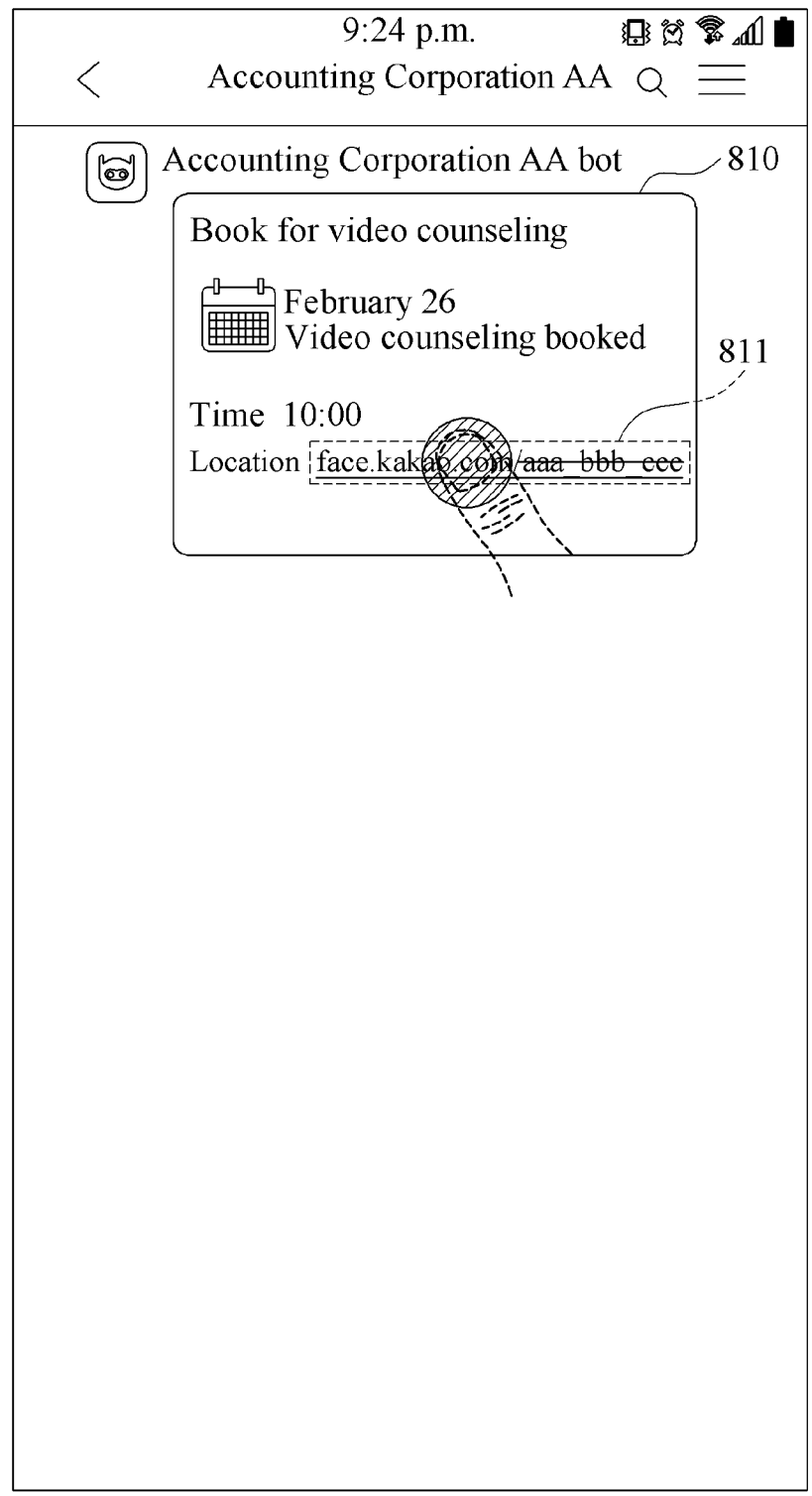
FIGS. 8A and 8B are diagrams illustrating an example embodiment for conducting counseling through a video call according to an example embodiment.
Figure 8B:
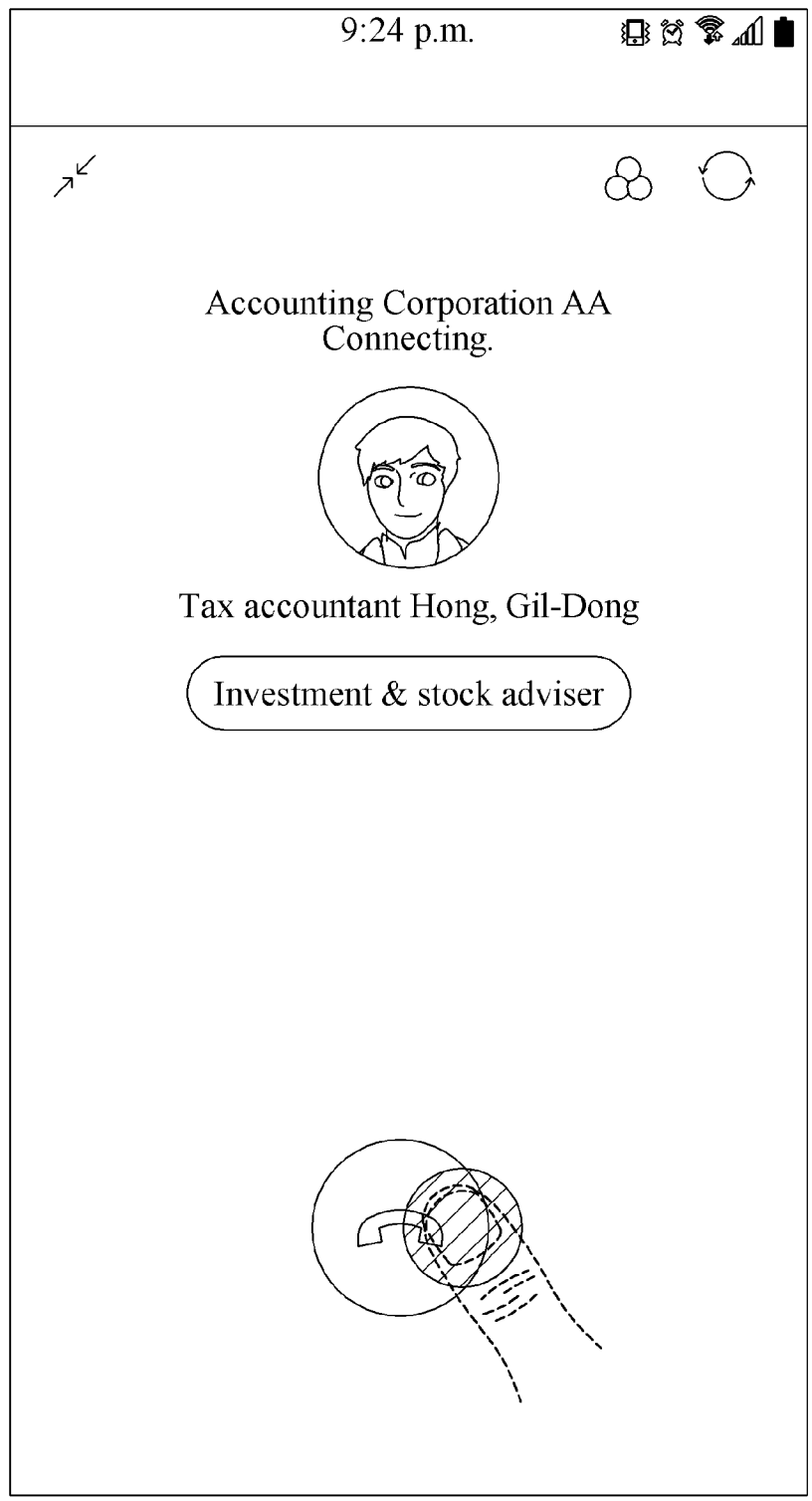

According to an example embodiment, a video call link may be provided as counseling content through a chat room of a channel. For example, referring to FIG. 8A, a video call link 811 may be shared through a message 810 for notifying the reservation details of the counseling transmitted through a chat room of a channel, and the video call link 811 may include a valid link when the state of the counseling ticket is in the progress state. Referring to FIG. 8B, the account of the first user and the expert account may be connected through a video call by a video call link, and the counseling may be conducted using the video call.

Figure 9A:
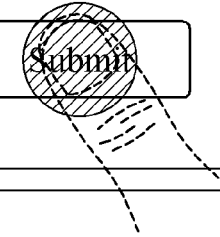
FIGS. 9A and 9B are diagrams illustrating an interface regarding counseling evaluation according to an example embodiment.
Figure 9B:

Referring back to FIG. 1, operation 140 of transmitting the counseling content according to an example embodiment may further include receiving an evaluation on the counseling from the account of the first user. After the counseling is completed, the first user may transmit the evaluation on the counseling with the first expert account to the server through the terminal, and the evaluation on the counseling received from the first user may be stored in correspondence to the first expert account. For example, referring to FIG. 9A, the server may provide an interface 910 for evaluation on the counseling with the first expert account to the terminal of the first user whose counseling is completed, and the terminal of the first user may transmit the evaluation information on the counseling to the server through the interface 910. The evaluation on the counseling received from the terminal of the first user may be stored in correspondence to the first expert account, and the server statistically processes the evaluation on the counseling to add a result of evaluation on the counseling to the profile of the first expert account. For example, as shown in FIG. 9B, the result of evaluation on the counseling with an expert account may be provided through the interface 920 that displays detailed information on the profile of the expert account.

Figure 10:
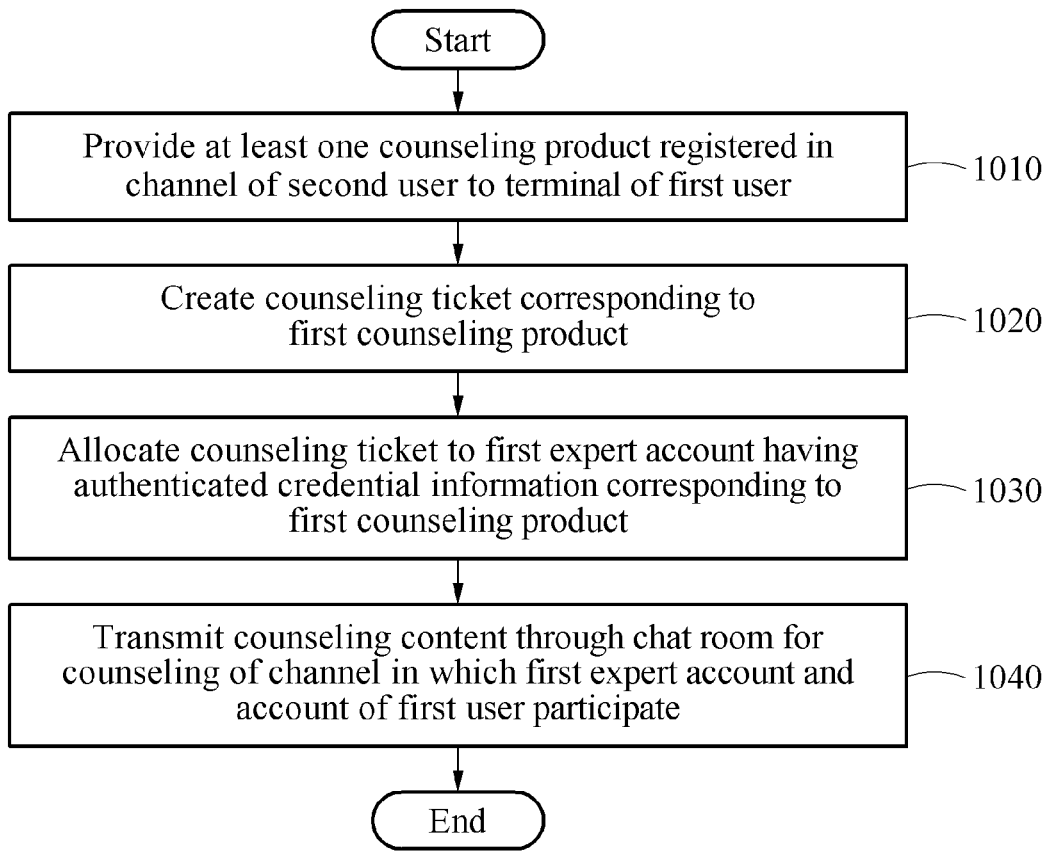
FIG. 10 is an operation flowchart illustrating a method of operating a counseling center server interworking with an instant messaging service according to an example embodiment.

FIG. 10 is an operation flowchart illustrating a method of operating a counseling center server interworking with an instant messaging service according to an example embodiment.

Referring to FIG. 10, a method of operating a counseling center server interworking with an instant messaging service may include providing at least one counseling product registered in correspondence with a channel of a second user to a terminal of a first user 1010, creating a counseling ticket corresponding to a first counseling product 1020, allocating the counseling ticket to the first expert account having authenticated credential information corresponding to the first counseling product 1030, and transmitting the counseling content through a chat room for counseling of a channel in which a first expert account and an account of the first user participate 1040.

The counseling service according to an example embodiment may include a professional counseling service conducted in a chatting manner between a user account requesting a counseling product registered in correspondence with the channel through the chat room of the channel of the second user and an expert account corresponding to the counseling product.

At least one counseling product may be registered in the channel of the second user according to an example embodiment. The counseling product is a counseling product opened for a service provided through the channel of the second user, and each counseling product may include each different counseling topic, counseling time, counseling data, and/or price. For example, the counseling data may include a document file, an audio file, and a video file corresponding to the counseling product.

Figure 12:
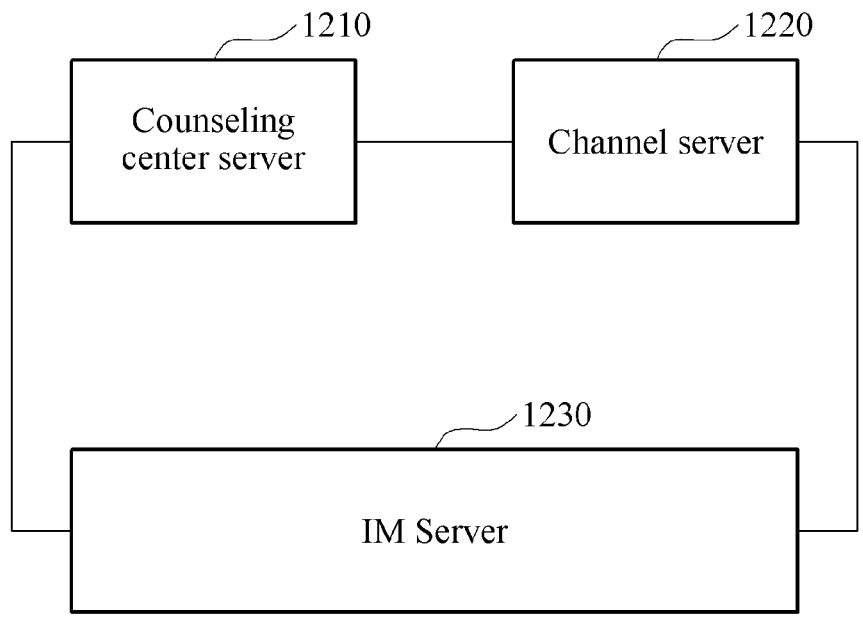
FIG. 12 is an exemplary diagram illustrating a configuration of a counseling system according to an example embodiment.

Operation 1010 according to an example embodiment may include providing, through the interface of the channel of the second user, at least one counseling product registered in correspondence with the channel to the terminal of the first user. For example, the counseling product may be registered (or stored) in the server in correspondence to the channel, or registered in the server managing the channel (e.g., the channel server 1220 as shown in FIG. 12), or registered in the instant messaging server. According to an example embodiment, the server may provide at least one counseling product registered in correspondence to the channel to the terminal of the first user through the interface of the channel of the second user. For example, the server may provide information on at least one counseling product registered in correspondence with a channel to the instant messaging server, and the instant messaging server may provide a list of counseling products registered in correspondence with the channel through an interface of the channel based on the information on the received counseling product.

Figure 11A:
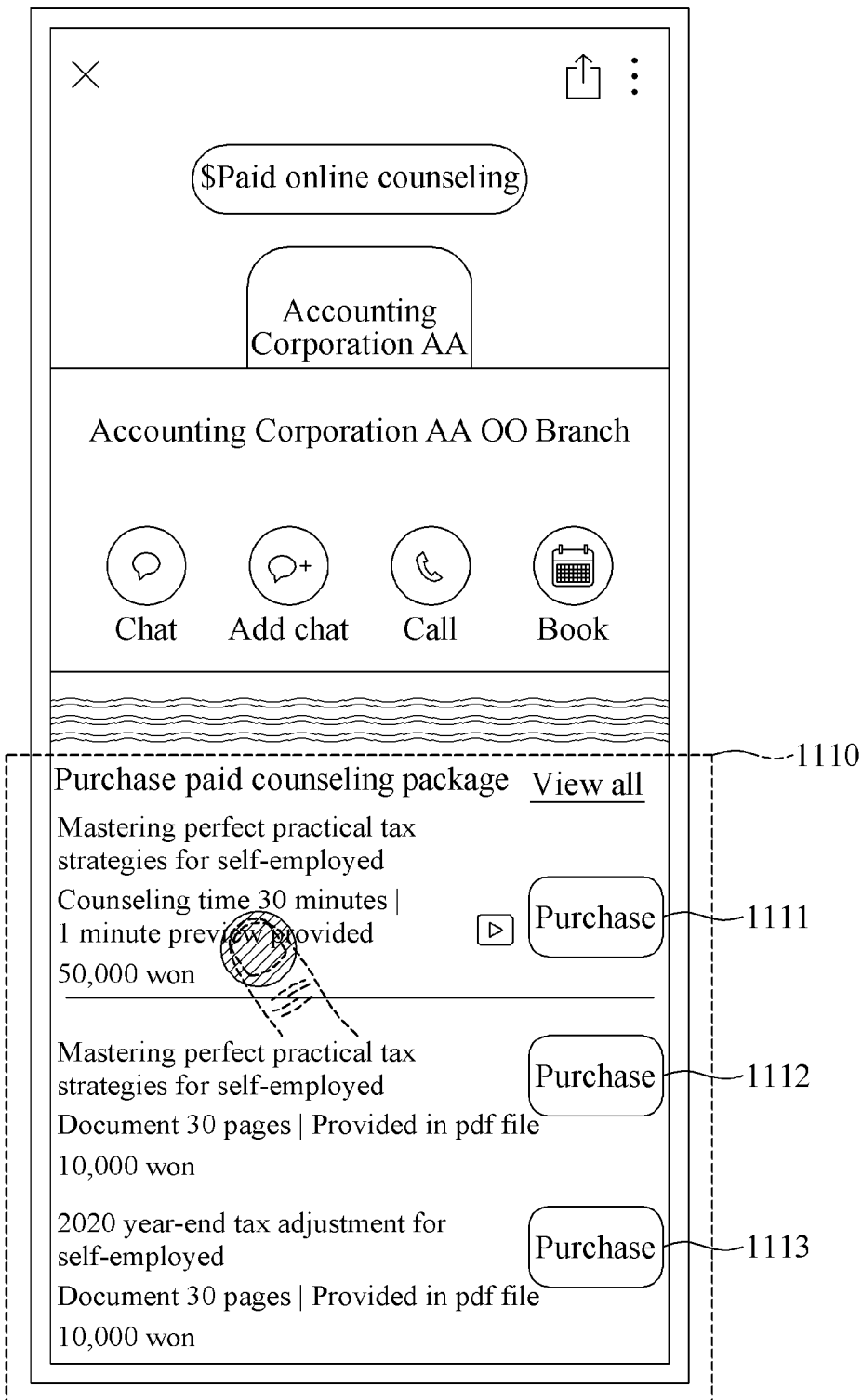
FIG. 11A is a diagram illustrating an interface of a channel including a counseling product according to an example embodiment.

For example, referring to FIG. 11A, an interface 1100 of the channel of the second user may include a view 1110 for displaying a list of at least one counseling product registered in correspondence with the channel. The view 1110 displaying the list of counseling products may include identification information such as a name, type, price, and introduction text corresponding to each counseling product registered in correspondence with the channel. The view 1110 for displaying the list of counseling products as shown in FIG. 11A is an example in which counseling products are displayed through the interface 1100 of the channel, and the view displaying the list of counseling products provided through the interface of the channel may be implemented in various forms for displaying information on the counseling product.

Referring back to FIG. 10, operation 1020 according to an example embodiment may include creating a counseling ticket corresponding to the first counseling product based on the input of the first user for selecting the first counseling product among the provided counseling products. For example, referring to FIG. 11A, in the terminal of the first user, an input for selecting (e.g., clicking) a button 1111, 1112, or 1113 to request a specific counseling product may correspond to the input of the first user for selecting the first counseling product in the view 1110 displaying the list of counseling products provided through the interface 1100 of the channel of the second user. For example, based on the input of the first user for selecting the first counseling product, a signal for requesting expert counseling corresponding to the counseling product through the channel of the second user may be transmitted to the server. As another example, based on the input of the first user for selecting the first counseling product, a signal for requesting expert counseling corresponding to a counseling product through the channel of the second user may be transmitted to the instant messaging server. In this case, a signal for requesting the expert counseling may be transmitted to the counseling center server through the instant messaging server.

Referring back to FIG. 10, operation 1020 according to an example embodiment may include creating a counseling ticket in response to the payment of the first user for the first counseling product. For example, in the case of a paid counseling product, a signal for requesting expert counseling corresponding to the counseling product through the channel of the second user may be transmitted to the instant messaging server in response to selection and payment for the counseling product. As another example, in the case of a paid counseling product, a signal for requesting expert counseling corresponding to the counseling product through the channel of the second user may be transmitted to the instant messaging server in response to selection and payment for the counseling product, and a signal for requesting the expert counseling may be transmitted to the counseling center server through the instant messaging server.

According to an example embodiment, when the input of the first user for selecting the first counseling product is received, a chat room of a channel in which the account of the first user participates may be created. More specifically, the input of the first user for selecting the first counseling product through the interface of the channel may be transmitted to the instant messaging server, and the instant messaging server may create a chat room of a channel for conducting the expert counseling corresponding to the first counseling product. The instant messaging server may provide a chat interface for counseling corresponding to the created chat room of the channel to the terminal of the first user. As described above, the chat interface for counseling may correspond to a user interface for transmitting and receiving counseling content including a chat message for counseling and displaying the transmitted and received counseling content.

Operation 1030 according to an example embodiment may include allocating a counseling ticket to the first expert account having authenticated credential information corresponding to a first counseling product among at least one expert account linked with a channel.

The first expert account according to an example embodiment may correspond to any one expert account selected as an allocation target for a counseling ticket among expert account(s) having authenticated credential information corresponding to the first counseling product. In other words, operation 1030 according to an example embodiment may include selecting any one of the plurality of expert accounts as the first expert account based on the number of counseling tickets allocated to each of the plurality of expert accounts having authenticated credential information corresponding to the first counseling product, and allocating the created counseling ticket to the selected first expert account.

According to an example embodiment, the created counseling ticket may be allocated to the first expert account in the waiting state, and the counseling ticket in the waiting state may be changed to the progress state in response to occurrence of an event that causes a state change of the counseling ticket. The event that causes a state change of the counseling ticket may include, for example, an event in which a message is received from the first expert account through a chat room of the channel. In other words, operation 1030 according to an example embodiment may include allocating the created counseling ticket to the first expert account in the waiting state, and changing the state of the counseling ticket from the waiting state to the progress state in response to a response message received from the first expert account through the chat room.

Operation 1040 according to an example embodiment may include transmitting, based on the state of the counseling ticket, the counseling content through a chat room for counseling of the channel in which the first expert account and the account of the first user participate. Operation 1040 according to an example embodiment may include at least one of transmitting a message transmitted from the first expert account through the chat room for counseling of the channel when the state of the counseling ticket is in the progress state, and receiving the message transmitted from the account of the first user through a chat room for counseling of the channel when the state of the counseling ticket is in the progress state.

Operation 1040 according to an example embodiment may include transmitting counseling data corresponding to the first counseling product through a chat room for counseling of a channel when the state of a counseling ticket is in the progress state.

Figure 11B:
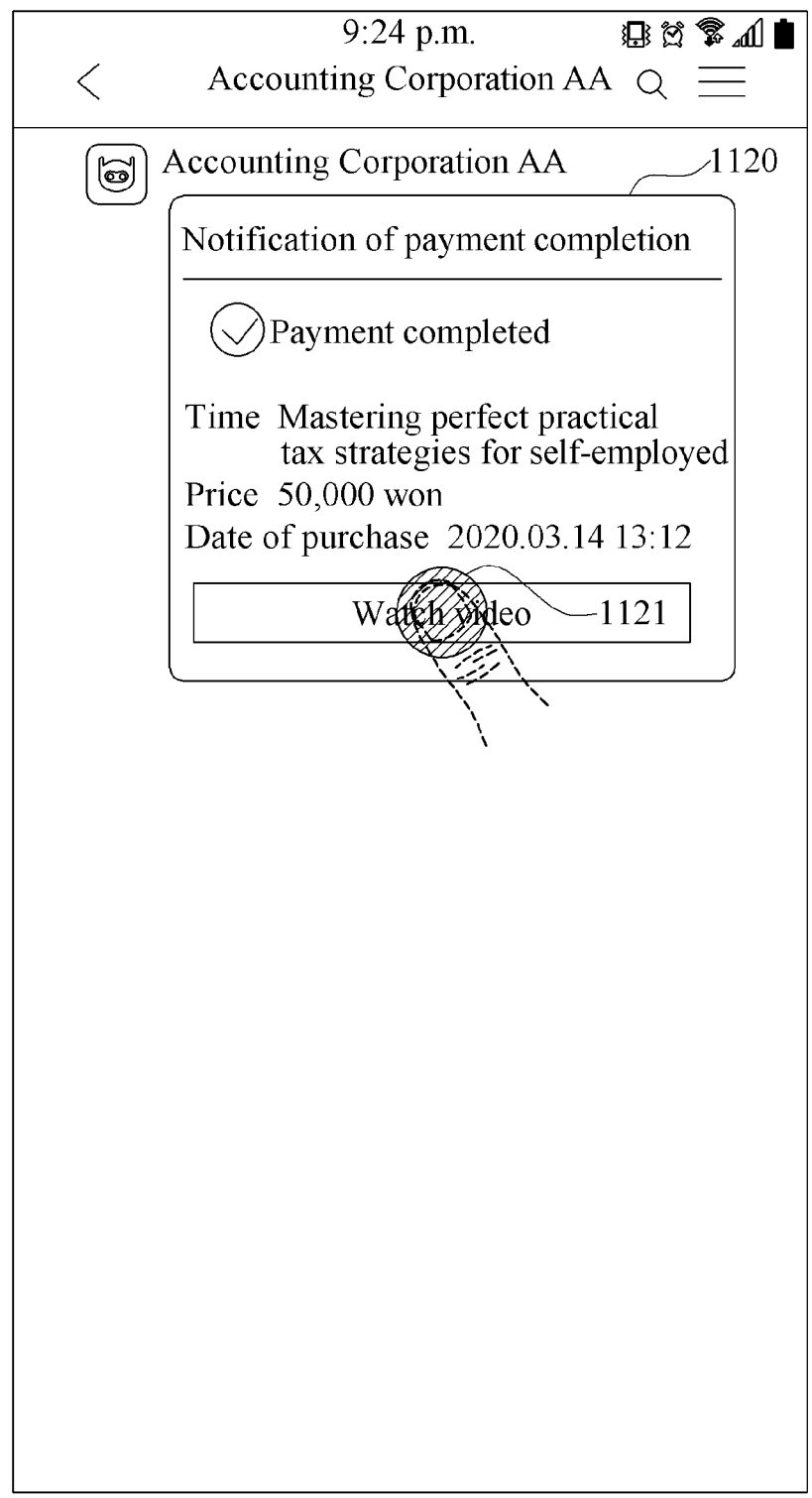
FIGS. 11B and 11C are diagrams illustrating an example embodiment provided with counseling data included in a counseling product according to an example embodiment.
Figure 11C:
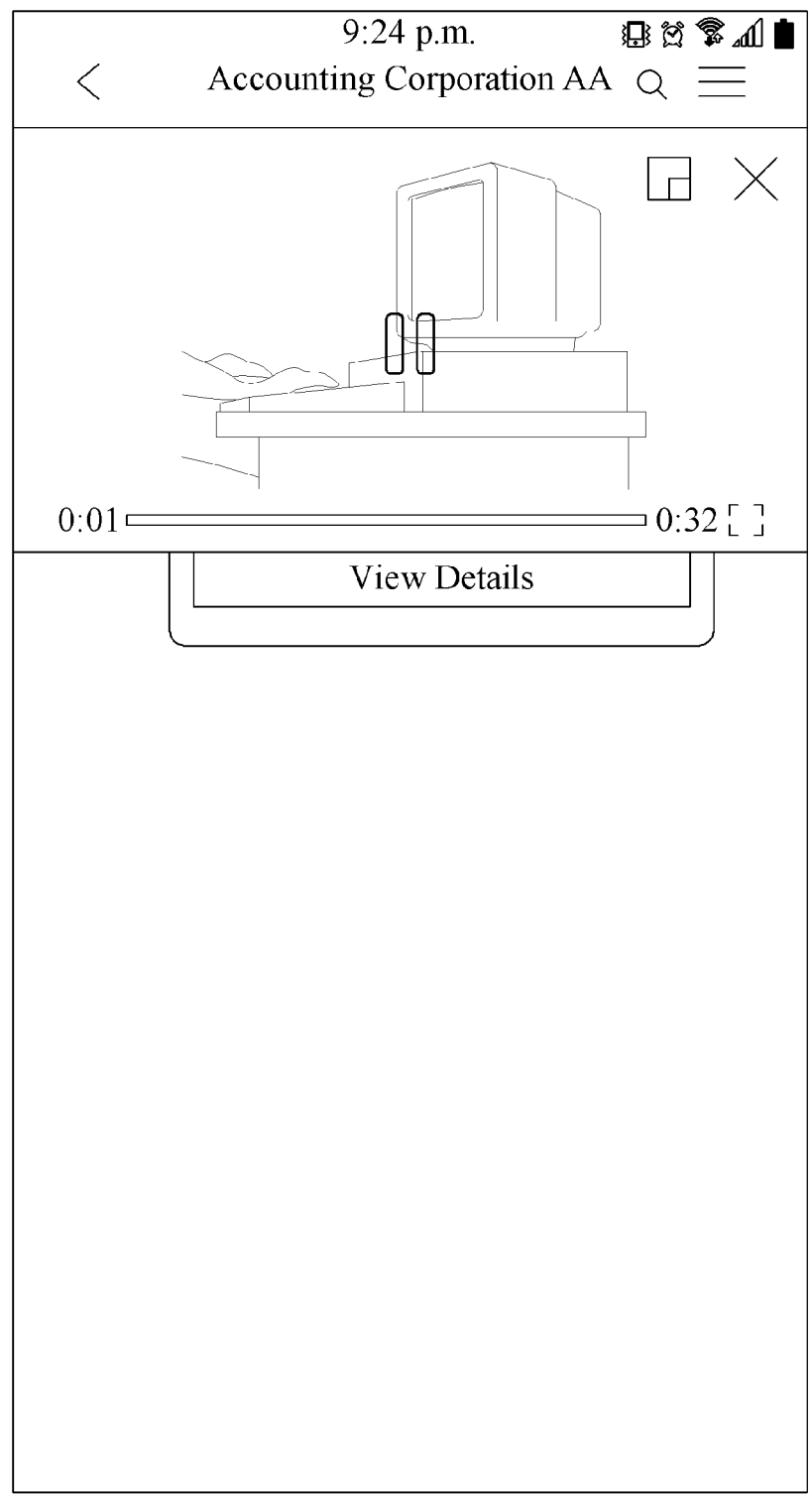

According to an example embodiment, the counseling data may be provided in advance through a chat room before the counseling ticket is changed to the progress state. For example, referring to FIG. 11B, when the payment for the counseling product is completed, a message 1120 regarding the counseling product may be transmitted through the chat room of the channel. The message 1120 regarding the counseling product may be implemented as an interfacing object including a function of requesting counseling data included in the counseling product. A button 1121 for requesting counseling data of the message 1120 regarding the counseling product may be included, and in response to an input of selecting the button 1121 for requesting counseling data, the counseling data (e.g., video) may be provided through the chat room as shown in FIG. 11C.

FIG. 12 is an exemplary diagram of a configuration of a counseling system according to an example embodiment.

Referring to FIG. 12, a counseling system according to an example embodiment may include a counseling center server 1210, a channel server 1220, and an instant messaging server 1230 (hereinafter, referred to as an IM server).

The counseling system may perform operations related to a counseling service conducted in a chatting manner between a personal account of a first user corresponding to a general user and a channel of a second user corresponding to a specific company or a specific service provider. A counselor (e.g., expert) linked to the channel of the second user may communicate with the counseling center server 1210 through a counseling center app installed in the terminal of a counselor or a counseling center web accessed from the terminal of the counselor, and access the chat room of the channel or the second user to transmit and receive messages through the chat room. The first user may communicate with the IM server 1230 through the instant messaging app installed in the terminal of the first user or the instant messaging web accessed from the terminal, and access the chat room of the channel of the second user to transmit and receive messages through the chat room.

According to an example embodiment, a message transmitted from the terminal of the first user through the chat room of the channel may be transmitted to the IM server 1230. The IM server 1230 may transmit the message to the channel server 1220, and the channel server 1220 may transmit the same to the counseling center server 1210.

According to an example embodiment, the counseling center server 1210 receiving the message may create a counseling ticket corresponding to the chat room when a counseling ticket corresponding to the chat room of the channel to which the message is transmitted is not created. The counseling center server 1210 may allocate the counseling ticket created in correspondence to the chat room of the channel of the second user to the account of a first counselor among the accounts of counselors linked to the channel of the second user. The counseling center server 1210 may transmit a message received through the chat room corresponding to a second type of counseling ticket to a terminal of a first counselor to which the counseling ticket is allocated.

The terminal of the first counselor according to an example embodiment may request the counselor center server 1210 to transmit a message through a chat room corresponding to the allocated counseling ticket, and the counseling center server 1210 may transmit a message to the terminal of the first user connected to the chat room through the IM server 1230.

According to an example embodiment, the counseling center server may correspond to an electronic device including a memory and a processor. The counseling center server may communicate with an external device such as a terminal of the first user through a network.

A processor of the counseling center server according to an example embodiment may be configured to perform operations of the counseling center server interworking with the instant messaging service described above with reference to FIGS. 1 to 11.

The memory of the counseling center server according to an example embodiment may be a computer-readable recording medium which may be a volatile memory or a non-volatile memory. The memory of the counseling center server according to an example embodiment may store information on the provision of the counseling service described above with reference to FIGS. 1 to 11. For example, a database for storing information on a counseling ticket including a chat log related to the counseling for each registered channel and the counseling ticket of the channel may be included.

According to an example embodiment, the memory of the counseling center server may store a program in which the above-described counseling service providing method is implemented. The processor may execute a program stored in the memory and control the device. The code of the program executed by the processor may be stored in the memory.

The example embodiments described herein may be implemented using hardware components, software components, and/or a combination thereof. For example, the apparatus, method, and components described in the example embodiments may be implemented using a general purpose computer or special purpose computer, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may run an operating system (OS) and one or more software applications that run on the OS. The processing device may also access, store, manipulate, process, and create data in response to execution of the software. For purpose of simplicity, the description of a processing device is used as singular, however, one skilled in the art will appreciate that the processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software may also be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations which may be performed by a computer. The media may also to include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter.

The described hardware devices may be configured to act as one or more software modules in order to perform the operations of the above-described example embodiments, or vice versa.

While this disclosure includes example embodiments, it will be apparent to one of ordinary skill in the art that various changes in form and details may be made in these example embodiments without departing from the spirit and scope of the claims and their equivalents. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of operating a counseling center server interworking with an instant messaging service, the method comprising:
providing, through an interface of a channel of a second user registered in the service, a profile of at least one expert account for counseling linked to the channel to a terminal of a first user;
identifying, based on an input of the first user for selecting a profile of a first expert account among the provided profile of the at least one expert account, an initiation condition for a counseling ticket for counseling with the first expert account, wherein the initiation condition is based on receiving payment for the counseling with the first expert account;
creating a chat room of the channel for transmitting counseling content, wherein the chat room is accessible to an account of the first user and the first expert account;
automatically creating, based on the input of the first user, a reservation message that includes a payment interface;
transmitting the reservation message to the terminal of the first user via the chat room;
obtaining payment from the first user using the payment interface of the reservation message;
determining that the initiation condition is satisfied based on the payment; and
based on determining that the initiation condition is satisfied:
creating, based on the initiation condition for the counseling ticket, a counseling ticket to be allocated to the first expert account; and
transmitting counseling content that includes a message including reservation details and a video call link through a chat room for counseling of the channel in which the first expert account and an account of the first user participate, based on a state of the counseling ticket.

2. The method of claim 1, wherein the providing of the profile of the expert account to the terminal of the first user comprises providing the profile of the expert account including authenticated credential information to the terminal of the first user.

3. The method of claim 1, wherein the initiation condition for the counseling ticket comprises at least one of:
a condition regarding reception of a message through the chat room for counseling of the channel corresponding to a first type of counseling;
a condition regarding counseling time corresponding to a second type of counseling; and
a condition regarding payment for counseling corresponding to a third type of counseling.

4. The method of claim 1, wherein the creating of the counseling ticket comprises:
creating the counseling ticket, based on the initiation condition for the counseling ticket corresponding to a first type of counseling, as a message is received from the account of the first user through the chat room for counseling of the channel;
allocating the created counseling ticket to the first expert account in a waiting state; and
changing the state of the counseling ticket from the waiting state to a progress state in response to a response message received from the first expert account through the chat room.

5. The method of claim 1, wherein the creating of the counseling ticket comprises:
creating a counseling ticket as a predetermined counseling time is reached based on the initiation condition for the counseling ticket corresponding to a second type of counseling; and
allocating the created counseling ticket to the first expert account in a progress state.

6. The method of claim 1, wherein the creating of the counseling ticket comprises:
allocating the created counseling ticket to the first expert account in a progress state.

7. The method of claim 1, wherein the transmitting of the counseling content comprises at least one of:
transmitting a message received from the first expert account through the chat room for counseling of the channel when the state of the counseling ticket is in a progress state; and
transmitting a message received from the account of the first user through the chat room for counseling of the channel when the state of the counseling ticket is in the progress state.

8. The method of claim 1, wherein the counseling content comprises at least one counseling data created as a message, a video call link, and a digital file.

9. The method of claim 1, wherein the transmitting of the counseling content further comprises receiving an evaluation on the counseling from the account of the first user.

10. One or more non-transitory computer-readable media collectively configured to store instructions executable by one or more processors to cause actions to be performed, the actions comprising:
providing, through an interface of a channel of a second user registered in the service, a profile of at least one expert account for counseling linked to the channel to a terminal of a first user;
identifying, based on an input of the first user for selecting a profile of a first expert account among the provided profile of the at least one expert account, an initiation condition for a counseling ticket for counseling with the first expert account, wherein the initiation condition is based on receiving payment for the counseling with the first expert account;
creating a chat room of the channel for transmitting counseling content, wherein the chat room is accessible to an account of the first user and the first expert account;
automatically creating a reservation message that includes reservation details and a payment interface;
transmitting the reservation message to the terminal of the fist user via the chat room;
obtaining the payment from the first user using the payment interface of the reservation message;
determining that the initiation condition is satisfied based on the payment; and
in response to determining that the initiation condition is satisfied:
creating, based on the initiation condition for the counseling ticket, a counseling ticket to be allocated to the first expert account; and
transmitting counseling content that includes a message including reservation details and a video call link through the chat room for counseling of the channel in which the first expert account and an account of the first user participate, based on a state of the counseling ticket.

11. A counseling center server interworking with an instant messaging service, comprising at least one processor configured to:
provide, through an interface of a channel of a second user registered in the service, a profile of at least one expert account for counseling linked to the channel to a terminal of a first user;
identify, based on an input of the first user for selecting a profile of a first expert account among the provided profile of the at least one expert account, an initiation condition for a counseling ticket for counseling with the first expert account, wherein the initiation condition is based on receiving payment for the counseling with the first expert account;
automatically create a chat room of the channel for transmitting counseling content, wherein the chat room is accessible to an account of the first user and the first expert account;
automatically create, based on the input of the first user, a reservation message that includes a link to a plug-in for payment;
transmit the reservation message to the terminal of the first user via the chat room;
obtain payment from the first user using the link to the plug-in for payment;
determine that the initiation condition is satisfied based on the payment; and
based on determining that the initiation condition is satisfied:
create, based on the initiation condition for the counseling ticket, a counseling ticket to be allocated to the first expert account; and
transmit counseling content that includes a message including reservation details and a video call link through the chat room for counseling of the channel in which the first expert account and an account of the first user participate, based on a state of the counseling ticket.

12. The counseling center server of claim 11, wherein the processor is configured to, in providing the profile of the expert account to the terminal of the first user, provide the profile of the expert account including authenticated credential information to the terminal of the first user.

13. The counseling center server of claim 11, wherein the initiation condition for the counseling ticket comprises at least one of:
a condition regarding reception of a message through the chat room for counseling of the channel corresponding to a first type of counseling;
a condition regarding counseling time corresponding to a second type of counseling; and
a condition regarding payment for counseling corresponding to a third type of counseling.

* * * * *